US011576072B2

(12) United States Patent
Goel

(10) Patent No.: US 11,576,072 B2
(45) Date of Patent: Feb. 7, 2023

(54) METHODS, SYSTEMS, AND COMPUTER-READABLE MEDIA FOR DISTRIBUTING S1 CONNECTIONS TO MOBILITY MANAGEMENT ENTITIES (MMES) AND N2 CONNECTIONS TO ACCESS AND MOBILITY MANAGEMENT FUNCTIONS (AMFS)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 49 days.

(21) Appl. No.: 17/027,633

(22) Filed: Sep. 21, 2020

(65) Prior Publication Data
US 2022/0095150 A1 Mar. 24, 2022

(51) Int. Cl.
H04W 28/02 (2009.01)
H04W 28/08 (2009.01)
(Continued)

(52) U.S. Cl.
CPC ......... *H04W 28/0226* (2013.01); *H04W 8/08* (2013.01); *H04W 28/0808* (2020.05); *H04W 48/16* (2013.01)

(58) Field of Classification Search
CPC ..... H04W 76/19; H04W 76/34; H04W 76/18; H04W 84/045; H04W 84/20;
(Continued)

(56) References Cited

U.S. PATENT DOCUMENTS 5,278,890 A 1/1994 Beeson, Jr. et al.
5,650,998 A 7/1997 Angenot et al.
(Continued)

FOREIGN PATENT DOCUMENTS

CN 1777143 A 5/2006
CN 101136943 A 3/2008
(Continued)

OTHER PUBLICATIONS

Extended Hearing Notice for Indian Patent Application Serial No. 6918/CHENP/2012 (Oct. 12, 2020).
(Continued)

*Primary Examiner* — Joseph E Avellino
*Assistant Examiner* — Mon Cheri S Davenport
(74) *Attorney, Agent, or Firm* — Jenkins, Wilson, Taylor & Hunt, P.A.

(57) ABSTRACT

A method for distributing connections to mobility management node instances includes publishing IP addresses for receiving connection requests and ingress messages from RAN nodes. The method further includes maintaining connection loading measurements of the mobility management node instances, receiving a connection request message generated by a RAN node for initiating a connection with one of the mobility management node instances, applying a connection distribution algorithm to select a mobility management node instance to handle the connection request message, and creating an association between an IP address of the selected mobility management node instance and an IP address and port of the RAN node extracted from a source IP address and source port field of the connection request. The method further includes forwarding the connection request message to the selected mobility management node instance.

18 Claims, 11 Drawing Sheets

(51) Int. Cl.
  *H04W 8/08* (2009.01)
  *H04W 48/16* (2009.01)

(58) Field of Classification Search
  CPC ... H04W 88/06; H04W 88/085; H04W 92/10; H04W 8/186; H04W 72/0426; H04W 72/005; H04W 72/0433; H04W 28/0808; H04W 36/06; H04W 36/00835; H04W 36/0077; H04L 12/185; H04L 43/08; H04L 47/125; H04L 43/12; H04L 61/2007
  See application file for complete search history.

(56) References Cited

U.S. PATENT DOCUMENTS

| | | | |
|---|---|---|---|
| 5,926,482 | A | 7/1999 | Christie et al. |
| 6,029,191 | A | 2/2000 | Kurashima |
| 6,108,409 | A | 8/2000 | Cooper et al. |
| 6,157,621 | A | 12/2000 | Brown et al. |
| 6,282,280 | B1 | 8/2001 | Rekieta et al. |
| 6,327,472 | B1 | 12/2001 | Westroos et al. |
| 6,515,985 | B2 | 2/2003 | Shmulevich et al. |
| 6,628,672 | B1 | 9/2003 | Cabello |
| 6,647,113 | B2 | 11/2003 | McCann et al. |
| 6,662,017 | B2 | 12/2003 | McCann et al. |
| 6,678,369 | B2 | 1/2004 | DeMent et al. |
| 6,760,343 | B1 | 7/2004 | Krishnamurthy et al. |
| 6,785,378 | B2 | 8/2004 | Mar |
| 6,788,774 | B1 | 9/2004 | Caldwell et al. |
| 6,826,198 | B2 | 11/2004 | Turina et al. |
| 6,901,262 | B2 | 5/2005 | Allison et al. |
| 6,944,184 | B1 | 9/2005 | Miller et al. |
| 6,965,567 | B2 | 11/2005 | Ramos et al. |
| 7,023,794 | B2 | 4/2006 | Khan et al. |
| 7,043,003 | B1 | 5/2006 | Friedl |
| 7,050,562 | B2 | 5/2006 | Allison et al. |
| 7,068,773 | B2 | 6/2006 | McCann et al. |
| 7,079,499 | B1 | 7/2006 | Akhtar et al. |
| 7,092,388 | B2 | 8/2006 | Jarlstedt |
| 7,092,505 | B2 | 8/2006 | Allison et al. |
| 7,127,057 | B2 | 10/2006 | Delaney et al. |
| 7,136,477 | B2 | 11/2006 | Craig et al. |
| 7,197,036 | B2 | 3/2007 | Craig |
| 7,222,192 | B2 | 5/2007 | Allison et al. |
| 7,257,215 | B2 | 8/2007 | Angermayr et al. |
| 7,260,086 | B2 | 8/2007 | Delaney et al. |
| 7,286,524 | B1 | 10/2007 | Loftus |
| 7,298,725 | B2 | 11/2007 | Rune |
| 7,372,953 | B2 | 5/2008 | Delaney et al. |
| 7,403,492 | B2 | 7/2008 | Zeng et al. |
| 7,440,472 | B2 | 10/2008 | Delaney et al. |
| 7,477,646 | B1 | 1/2009 | Peterson et al. |
| 7,522,580 | B2 | 4/2009 | Miller et al. |
| 7,532,647 | B2 | 5/2009 | Eichler et al. |
| 7,554,974 | B2 | 6/2009 | Palmer et al. |
| 7,564,870 | B2 | 7/2009 | Miller et al. |
| 7,590,732 | B2 | 9/2009 | Rune |
| 7,633,969 | B2 | 12/2009 | Caugherty et al. |
| 7,760,706 | B2 | 7/2010 | Delaney et al. |
| 7,892,991 | B2 | 2/2011 | Yamanaka et al. |
| 7,898,957 | B2 | 3/2011 | Lea et al. |
| 7,970,402 | B2 | 6/2011 | Wu et al. |
| 8,201,219 | B2 | 6/2012 | Jones |
| 8,369,313 | B2 | 2/2013 | Lu et al. |
| 8,423,678 | B2 | 4/2013 | Darbyshire et al. |
| 8,468,267 | B2 | 6/2013 | Yigang et al. |
| 8,478,828 | B2 | 7/2013 | Craig et al. |
| 8,483,233 | B2 | 7/2013 | Craig et al. |
| 8,504,630 | B2 | 8/2013 | Craig et al. |
| 8,549,146 | B2 | 10/2013 | Stanisic et al. |
| 8,578,050 | B2 | 11/2013 | Craig et al. |
| 8,687,622 | B2 | 4/2014 | McNair et al. |
| 8,737,210 | B2 | 5/2014 | Tremblay et al. |
| 8,799,391 | B2 | 8/2014 | Craig et al. |
| 8,817,627 | B2 | 8/2014 | Delaney et al. |
| 8,855,082 | B2 | 10/2014 | Grayson et al. |
| 8,879,431 | B2 | 11/2014 | Ridel et al. |
| 8,948,016 | B2 | 2/2015 | Kruglick |
| 8,958,306 | B2 | 2/2015 | McCann et al. |
| 8,996,614 | B2 | 3/2015 | Choudhary et al. |
| 9,088,478 | B2 | 7/2015 | Craig et al. |
| 9,332,053 | B2 | 5/2016 | Sheer |
| 9,652,277 | B2 | 5/2017 | Broustis et al. |
| 9,729,454 | B2 | 8/2017 | Zaidi et al. |
| 10,027,577 | B2 | 7/2018 | Karandikar et al. |
| 10,999,202 | B2 * | 5/2021 | Kumar ................ H04L 47/125 |
| 11,206,549 | B1 * | 12/2021 | Eyuboglu ............ H04J 11/0073 |
| 2001/0029182 | A1 | 10/2001 | McCann et al. |
| 2001/0055380 | A1 | 12/2001 | Benedyk et al. |
| 2002/0069278 | A1 | 6/2002 | Forslow |
| 2002/0116522 | A1 | 8/2002 | Zelig |
| 2002/0141346 | A1 | 10/2002 | Garcia-Luna-Aceves et al. |
| 2002/0176430 | A1 | 11/2002 | Sangha et al. |
| 2002/0186702 | A1 | 12/2002 | Ramos et al. |
| 2003/0016684 | A1 | 1/2003 | Prasad et al. |
| 2003/0061234 | A1 | 3/2003 | All et al. |
| 2003/0108067 | A1 | 6/2003 | Craig et al. |
| 2003/0115358 | A1 | 6/2003 | Yun |
| 2003/0169779 | A1 | 9/2003 | Craig |
| 2004/0037278 | A1 | 2/2004 | Wong et al. |
| 2004/0081206 | A1 | 4/2004 | Allison et al. |
| 2004/0203849 | A1 | 10/2004 | Allison et al. |
| 2004/0240658 | A1 | 12/2004 | Delaney et al. |
| 2004/0264671 | A1 | 12/2004 | Lamberton et al. |
| 2004/0264675 | A1 | 12/2004 | Delaney et al. |
| 2005/0013290 | A1 | 1/2005 | Allison et al. |
| 2005/0047401 | A1 | 3/2005 | Garnero et al. |
| 2005/0111442 | A1 | 5/2005 | Delaney et al. |
| 2005/0120095 | A1 | 6/2005 | Aman et al. |
| 2005/0232407 | A1 | 10/2005 | Craig et al. |
| 2005/0235065 | A1 | 10/2005 | Le et al. |
| 2006/0013264 | A1 | 1/2006 | Eichler et al. |
| 2006/0067503 | A1 | 3/2006 | Caugherty et al. |
| 2006/0101159 | A1 | 5/2006 | Yeh et al. |
| 2007/0180113 | A1 | 8/2007 | Van Bemmel |
| 2008/0013446 | A1 | 1/2008 | Xu et al. |
| 2008/0043614 | A1 | 2/2008 | Soliman |
| 2008/0127232 | A1 | 5/2008 | Langen et al. |
| 2008/0146763 | A1 | 6/2008 | Yamanaka et al. |
| 2008/0192744 | A1 | 8/2008 | Simon |
| 2008/0282254 | A1 | 11/2008 | Blander et al. |
| 2009/0041043 | A1 | 2/2009 | Belling et al. |
| 2009/0083861 | A1 | 3/2009 | Jones |
| 2010/0299451 | A1 | 11/2010 | Yigang et al. |
| 2011/0035437 | A1 | 2/2011 | Toumura |
| 2011/0075564 | A1 | 3/2011 | Wung |
| 2011/0116382 | A1 | 5/2011 | McCann et al. |
| 2011/0185065 | A1 * | 7/2011 | Stanisic ................ G06F 9/505 709/228 |
| 2011/0199906 | A1 | 8/2011 | Kanode et al. |
| 2011/0200053 | A1 | 8/2011 | Kanode et al. |
| 2011/0200054 | A1 | 8/2011 | Craig et al. |
| 2011/0202604 | A1 | 8/2011 | Craig et al. |
| 2011/0202612 | A1 | 8/2011 | Craig et al. |
| 2011/0202613 | A1 | 8/2011 | Craig et al. |
| 2011/0202614 | A1 | 8/2011 | Craig et al. |
| 2011/0202676 | A1 | 8/2011 | Craig et al. |
| 2011/0202677 | A1 | 8/2011 | Craig et al. |
| 2011/0202684 | A1 | 8/2011 | Craig et al. |
| 2011/0314178 | A1 | 12/2011 | Kanode et al. |
| 2012/0158872 | A1 | 6/2012 | McNamee et al. |
| 2012/0191847 | A1 | 7/2012 | Nas et al. |
| 2012/0221899 | A1 | 8/2012 | Cervenak et al. |
| 2012/0226758 | A1 | 9/2012 | Sprague et al. |
| 2012/0230187 | A1 | 9/2012 | Tremblay et al. |
| 2012/0233240 | A1 | 9/2012 | Chatilla et al. |
| 2013/0064093 | A1 | 3/2013 | Ridel et al. |
| 2013/0094362 | A1 | 4/2013 | Qiu et al. |
| 2013/0117847 | A1 | 5/2013 | Friedman et al. |
| 2013/0322430 | A1 | 12/2013 | Mann |
| 2013/0329740 | A1 | 12/2013 | Wallace et al. |
| 2013/0339540 | A1 | 12/2013 | Sheer |
| 2013/0346549 | A1 | 12/2013 | Craig et al. |

(56) References Cited

U.S. PATENT DOCUMENTS

| | | | |
|---|---|---|---|
| 2014/0153563 | A1 | 6/2014 | Hlibiciuc et al. |
| 2014/0237111 | A1 | 8/2014 | McMurry et al. |
| 2014/0304415 | A1 | 10/2014 | Prakash et al. |
| 2014/0348176 | A1 | 11/2014 | Sprague et al. |
| 2015/0117308 | A1 | 4/2015 | Kant |
| 2016/0057214 | A1 | 2/2016 | Anand et al. |
| 2016/0094383 | A1 | 3/2016 | Wang et al. |
| 2016/0191631 | A1 | 6/2016 | Haraszti et al. |
| 2016/0212052 | A1 | 7/2016 | Zaidi et al. |
| 2017/0034048 | A1 | 2/2017 | Karandikar et al. |
| 2020/0169878 | A1 | 5/2020 | Thomas et al. |
| 2020/0177508 | A1 | 6/2020 | Kumar et al. |

FOREIGN PATENT DOCUMENTS

| | | |
|---|---|---|
| CN | 101150512 A | 3/2008 |
| CN | 101588606 A | 11/2009 |
| CN | 201180018814.2 | 2/2011 |
| CN | 201180013681.X | 6/2015 |
| CN | 102893556 B | 8/2016 |
| CN | 201510317392.9 | 4/2018 |
| EP | 1 134 939 A1 | 9/2001 |
| EP | 2 534 790 B1 | 4/2016 |
| IN | 338985 | 6/2020 |
| IN | 346335 | 9/2020 |
| IN | 373317 | 7/2021 |
| JP | H0537596 | 2/1993 |
| WO | WO 2000/60812 | 10/2000 |
| WO | WO 2005/052743 | 6/2005 |
| WO | WO 2006/036500 A2 | 4/2006 |
| WO | WO 2008/105976 | 9/2008 |
| WO | WO 2009/042062 A2 | 4/2009 |
| WO | WO 2009/043384 A1 | 4/2009 |
| WO | WO 2009/070179 A1 | 6/2009 |
| WO | WO 2009/128837 A1 | 10/2009 |
| WO | WO 2011/100587 | 8/2011 |
| WO | WO 2011/100594 | 8/2011 |
| WO | WO 2011/100603 | 8/2011 |
| WO | WO 2020/112154 A1 | 6/2020 |
| WO | WO 2022/060413 A1 | 3/2022 |

OTHER PUBLICATIONS

Advisory Action and Applicant—Initiated Interview Summary for U.S. Appl. No. 16/206,592 (dated Sep. 29, 2020).

Hearing Notice for Indian Patent Application Serial No. 6918/CHENP/2012 (Sep. 14, 2020).

Hearing Notice for Indian Patent Application Serial No. 7525/CHENP/2012 (Jul. 10, 2020).

Final Office Action for U.S. Appl. No. 16/206,592 (dated Jun. 19, 2020).

Applicant—Initiated Interview Summary for U.S. Appl. No. 16/206,592 (dated May 14, 2020).

Hearing Notice for Indian Patent Application Serial No. 6816/CHENP/2012 (Feb. 12, 2020).

Notification of Transmittal of the International Search Report and the Written Opinion of the International Searching Authority, or the Declaration for International Application No. PCT/US2019/018992 (dated Aug. 19, 2019).

Decision to grant a European patent pursuant to Article 97(1) EPC for European Patent Application No. 11742894.6 (dated Jun. 28, 2018).

"Load Balancer Configuration Options," Atlassian Documentation, https://confluence.atlassian.com, pp. 1-2 (May 22, 2018).

First Examination RFeport for Indian Patent Application No. 6816/CHENP/2012 (dated May 10, 2018).

Notice of Allowance and Fee(s) Due for U.S. Appl. No. 14/813,072 (dated Mar. 21, 2018).

Communication under Rule 71(3) EPC for European Patent Application No. 11 742 894.6 (dated Feb. 22, 2018).

Letter Regarding Notification to Grant for Chinese Patent Application No. ZL201510317392.9 (dated Jan. 30, 2018).

Advisory Action Before the Filing of an Appeal Brief for U.S. Appl. No. 14/813,072 (dated Jan. 11, 2018).

Communication pursuant to Article 94(3) EPC for European Application No. 11 742 894.6 (dated Nov. 30, 2017).

Final Office Action for U.S. Appl. No. 14/813,072 (dated Nov. 3, 2017).

Teichman, "Gain a Redundancy Advantage When You Migrate SS7 and Diameter Signaling to the Cloud," Ribbon Communications Blog, pp. 1-3 (Oct. 20, 2017).

"Sonus Diameter Signaling Controller (DSC) and SS7 Solutions," Sonus, pp. 1-5 (2017).

Notification of the First Office Action for Chinese Patent Application No. 201510317392.9 (dated Jun. 20, 2017).

Non-Final Office Action for U.S. Appl. No. 14/813,072 (dated May 12, 2017).

Notice of Allowance and Fee(s) due for U.S. Appl. No. 14/601,906 (dated Mar. 31, 2017).

Communication pursuant to Article 94(3) EPC corresponding to European Application No. 11 742 894.6 (dated Dec. 2, 2016).

Non-Final Office Action for U.S. Appl. No. 14/601,906 (dated Sep. 30, 2016).

Letter regarding Certificate of Patent for Israeli Patent Application No. 221424 (Jul. 1, 2016).

Barclay, "Automatic Scaling with Amazon ECS," AWS Compute Blog, pp. 1-6 (May 18, 2016).

Letter regarding Decision to Grant for Chinese Application No. ZL201180013555.4 (dated Apr. 21, 2016).

Letter regarding Decision to Grant for European Application No. 11742901.9 (dated Apr. 1, 2016).

Letter regarding Notification to Grant for Chinese Patent Application No. ZL201180018814.2 (dated Jul. 20, 2015).

Extended European Search Report for European Application No. 11742906.8 (dated Jun. 26, 2015).

Letter regarding Decision to Grant for Chinese Patent Application No. ZL201180013681.X (dated Apr. 13, 2015).

Second Office Action for Chinese Patent Application No. 201180013555.4 (dated Mar. 20, 2015).

Letter regarding Notice Before Examination for Israel Patent Application No. 221424 (dated Jan. 11, 2015).

First Office Action for Chinese Patent Application No. 201180018814.2 (dated Oct. 30, 2014).

First Office Action for Chinese Application No. 201180013681.X (dated Aug. 18, 2014).

First Office Action for Chinese Patent Application No. 201180013555.4 (dated Jul. 3, 2014).

Notice of Allowance for U.S. Appl. No. 12/797,197 dated May 21, 2014.

Notice of Allowance and Fee(s) Due for U.S. Appl. No. 13/932,608 (dated Apr. 9, 2014).

Final Office Action for U.S. Appl. No. 12/797,197 dated Jan. 27, 2014.

"Diameter Interface Support," Chapter 2, Cisco Service Control Mobile Solution Guide, http://www.cisco.com/c/en/us/td/docs/cable/serv_exch/serv_control/broadband_app/rel41x/mobile_sol/mobile_sol/02 mobile diameter.pdf, pp. 2-1-2-8 (Dec. 23, 2013).

Extended European Search Report for European Application No. 11742894.6 (dated Dec. 2, 2013).

"IP Front End (IPFE) User Guide," Eagle® XG Diameter Signaling Router, 910-6826-001 Revision A, pp. 1-29 (Nov. 2013).

"SS7 SIGTRAN Solution Guide," Cisco, pp. 1-8 (Oct. 31, 2013).

Non-Final Office Action for U.S. Appl. No. 12/797,197 dated Jul. 3, 2013.

Commonly-Assigned, Co-Pending Continuation U.S. Appl. No. 13/932,608 titled "Methods, Systems, and Computer Readable Media for Inter-Diameter-Message Processor Routing," (unpublished, filed Jul. 1, 2013).

Notice of Allowance and Fee(s) Due for U.S. Appl. No. 13/026,076 (dated Jun. 27, 2013).

Notice of Allowance and Fee(s) Due for U.S. Appl. No. 13/026,031 (dated May 30, 2013).

(56) References Cited

OTHER PUBLICATIONS

Supplemental Notice of Allowability for U.S. Appl. No. 13/025,968 (dated Apr. 1, 2013).
Supplemental Notice of Allowability for U.S. Appl. No. 13/026,031 (dated Mar. 22, 2013).
Notice of Allowance and Fee(s) Due for U.S. Appl. No. 13/025,968 (dated Feb. 27, 2013).
Final Office Action for U.S. Appl. No. 12/797,197 dated Feb. 11, 2013.
Notice of Allowance and Fee(s) Due for U.S. Appl. No. 13/026,031 (dated Jan. 30, 2013).
Final Official Action for U.S. Appl. No. 13/026,076 (dated Dec. 7, 2012).
Communication of European Publication Number and Information on the Application of Article 67(3) EPC for European Patent Application No. 11742906.8 (dated Nov. 21, 2012).
Communication of European Publication Number and Information on the Application of Article 67(3) EPC for European Patent Application No. 11742901.9 (dated Nov. 21, 2012).
Communication of European Publication Number and Information on the Application of Article 67(3) EPC for European Patent Application No. 11742894.6 (dated Nov. 21, 2012).
Fajardo et al., "Diameter Base Protocol," RFC 6733, pp. 1-152 (Oct. 2012).
Non-Final Office Action for U.S. Appl. No. 12/797,197 dated Jul. 9, 2012.
Non-Final Official Action for U.S. Appl. No. 13/026,076 (dated Jun. 9, 2012).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024601 (dated Oct. 20, 2011).
Notification of Transmittal of the International Search Report and the Written Opinion of the International Searching Authority, or the Declaration for International Application No. PCT/US2011/024588 (dated Oct. 20, 2011).
Communication pursuant to Article 94(3) EPC for European Application No. 04 811 530.7 (dated Feb. 11, 2011).
Notice of Allowance for U.S. Appl. No. 10/993,738 dated Jun. 25, 2010.
Commonly-Assigned, co-pending Divisional U.S. Appl. No. 12/797,197 for "Methods and Systems for Message Transfer Part (MTP) Load Sharing Using MTP Load Sharing Groups", (Unpublished, filed Jun. 9, 2010).
Notice of Allowance for U.S. Appl. No. 10/993,738 dated Mar. 5, 2010.
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem CX and DX Interfaces; Signalling Flows and Message Contents (3GPP TS 29.228 Version 8.7.0 .Release 8)." ETSI TS 129 228 V8.7.0 (Jan. 2010).

Jones et al., "Diameter Extended NAPTR," Individual Submission Internet-Draft, draft-ietf-dime-extended-naptr-00, pp. 1-9 (Dec. 29, 2009).
3GPp, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Supplemental Notice fo Allowability for U.S. Appl. No. 11/147,144 (dated Nov. 17, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
Notice of Allowance and Fee(s) Due for U.S. Appl. No. 11/147,144 (dated Aug. 17, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
Non-Final Office Action for U.S. Appl. No. 10/993,738 dated Jul. 16, 2009.
Official Action for U.S. Appl. No. 11/147,144 (dated Jul. 7, 2009).
Bhardwaj, "Roaming Hubbing & LTE," GSMA London, pp. 1-11 (May 19, 2009).
Matijašević et al., "Mechanisms for Diameter service performance enhancement," http://www.mrtc.mdh.se/qimpress/files/SoftCOM_DMatijasevic.pdf, pp. 1-5 (2009).
Non-Final Office Action for U.S. Appl. No. 10/993,738 dated Nov. 13, 2008.
Official Action for U.S. Appl. No. 11/147,144 (dated Nov. 13, 2008).
Tsou et al., "Diameter Routing Extensions," draft-tsou-dime-base-routing-ext-04, Internet-Draft, pp. 1-28 (Jul. 29, 2008).
Notification of Transmittal of the International Search Report and the Written Opinion of the International Searching Authority, or the Declaration for International Application No. PCT/US05/32070 (dated Jul. 11, 2008).
Supplementary European Search Report for European Patent Application No. 04811530.7-1249 (dated Apr. 15, 2008).
Non-Final Office Action for U.S. Appl. No. 10/993,738 dated Feb. 5, 2008.
Notification of European publication Number and information on the application of Article 67(3) EPC for European Application No. 04811530.7 (dated Aug. 9, 2006).
Notification of Transmittal of the International Search Report and the Written Opinion of the International Searching Authority, or the Declaration for International Application No. PCT/US2004/38827 (dated Jul. 11, 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Morneault et al., "Signaling System 7 (SS7) Message Transfer Part 3 (MTP3)—User Adaptation Layer (M3UA)," RFC 4666, pp. 1-125 (Sep. 2006).
Eronen et al., "Diameter Extensible Authentication Protocol (EAP) Application," Network Working Group, RFC 4072, pp. 1-31 (Aug. 2005).
Zhang, "Study and Implementation of Streaming Media AAA System based on Linux," Chinese Masters Thesis, Databased Information Science and Technology, pp. 54-55, 65-66 (Jul. 15, 2005).

(56) References Cited

OTHER PUBLICATIONS

Calhoun et al., "Diameter Base Protocol," Network Working Group, RFC 3588, pp. 1-148 (Sep. 2003).

Sidebottom et al., "Signaling System 7 (SS7) Message Transfer Part 3 (MTP3)—User Adaptation Layer (M3UA)," RFC 3332, pp. 1-113 (Sep. 2002).

Stewart et al., "Stream Control Transmission Protocol," Network Working Group RFC 2960, pp. 1-134 (Oct. 2000).

Greene et al., "Bi-Directional Session Setup Extension to Diameter," Internet Draft <draft-greene-diameter-ss7-session-00.txt>, pbs. 1-12 (Jul. 1998).

Jabbari, "Routing and Congestion Control in Common Channel Signaling System No. 7", Proceedings of the IEEE, vol. 80, No. 4, pp. 607-617 (Apr. 1992).

Notice of Allowance and Fee(s) Due and Examiner Initiated Interview Summary for U.S. Appl. No. 16/206,592 (dated Jan. 7, 2021).

Saeidi et al., "Intelligent Network Services in Migration from PSTN toward NGN," Iran Telecommunications Research Center, pp. 265-269 (2006).

Sengar et al., "SS7 Over IP: Signaling Interworking Vulnerabilities," IEEE Network, pp. 32-41 (Nov./Dec. 2006).

Chiang et al., "Transport of Mobile Application Part Signaling over Internet Protocol," Architectures and Protocols for Wireless Mobile Internet, IEEE Communications Magazine, pp. 124-128 (May 2002).

Notice of Allowance and Fee(s) Due for U.S. Appl. No. 13/910,091 (dated Dec. 30, 2015).

Non-Final Office Action for U.S. Appl. No. 13/910,091 (dated Sep. 3, 2015).

Stewart, "Stream Control Transmission Protocol," RFC 4960, pp. 1-153 (Sep. 2007).

Notification of Transmittal of the International Search Report and the Written Opinion of the International Searching Authority, or the Declaration for International Application No. PCT/US2021/024001 (dated Jun. 15, 2021).

Communication of European Publication Number and Information on the Application of Article 67(1) and (2) EPC for European Patent Application No. 19710203.1 (dated Sep. 8, 2021).

First Examination Report for Indian Patent Application Serial No. 202147017825 (dated Aug. 4, 2022).

\* cited by examiner

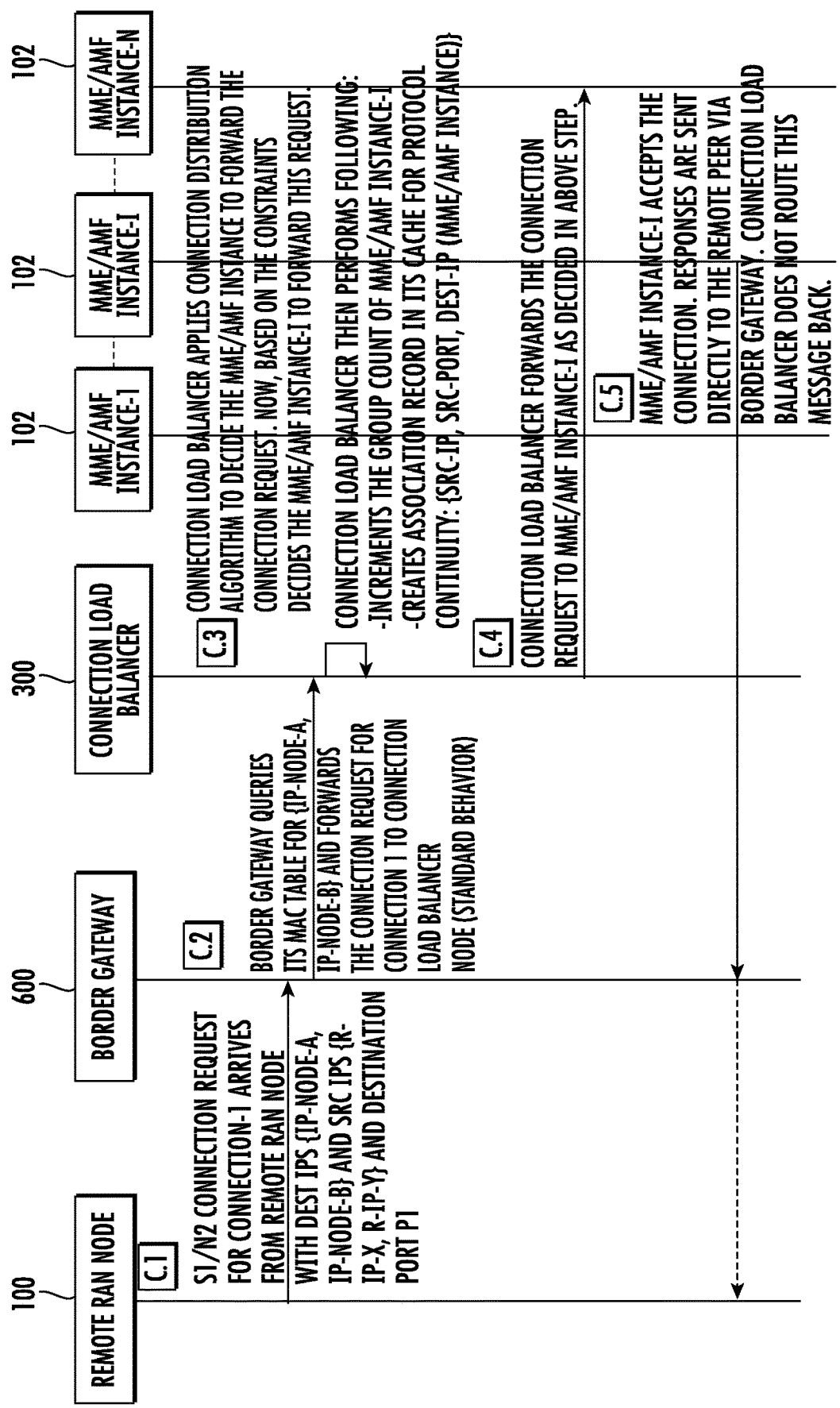

METHODS, SYSTEMS, AND COMPUTER-READABLE MEDIA FOR DISTRIBUTING S1 CONNECTIONS TO MOBILITY MANAGEMENT ENTITIES (MMES) AND N2 CONNECTIONS TO ACCESS AND MOBILITY MANAGEMENT FUNCTIONS (AMFS)

TECHNICAL FIELD

The subject matter described herein relates to connection distribution in mobile communications networks. More particularly, the subject matter described herein relates to methods, systems, and computer readable media for distributing S1 connections to MMEs and N2 connections to AMFs.

BACKGROUND

In 4G mobile communications networks, the mobility management entity is the node that communicates with the radio access node to perform mobility related functions on behalf of mobile subscribers. In 5G communications networks, the AMF is the node that communicates with the radio access nodes to perform the mobility related functions on behalf of use. The connection between the radio access node and the MME node is referred to as an S1 connection, as the interface between the radio access nodes and the MME is the S1 interface. Similarly, in 5G communications networks, the interface between the radio access node and the AMF is referred to as the N2 interface and the connections on the interface are referred to as N2 connections.

One problem that occurs in mobile communications networks, is that MME and AMF nodes may be required to be scaled up or down, especially in cloud configurations. During the scaling up or scaling down of the MME or AMF nodes, S1 or N2 connections may need to be added or removed. Adding or removing S1 or N2 connections may be disruptive of radio access nodes.

In light of these difficulties, there exists a need for improved methods, systems, and computer readable media for allowing reconfiguration of MME or AMF nodes without adversely affecting the S1 or N2 connections with the radio access nodes.

SUMMARY

A method for distributing connections to mobility management node instances includes publishing Internet protocol (IP) addresses for receiving connection requests (such as S1 or N2 connection requests) and ingress messages from radio access network (RAN) nodes. The method further includes maintaining, by the connection load balancer, connection loading measurements of the mobility management node instances. The method further includes receiving, at the connection load balancer, a connection request message generated by a RAN node for initiating a connection with one of the mobility management node instances. The method further includes applying, by the connection load balancer, a connection distribution algorithm to select a mobility management node instance to handle the connection request message. The method further includes creating, by the connection load balancer, for protocol continuity, and in a database or cache populated at least in part by the connection load balancer, an association between an IP address of the selected mobility management node instance and an IP address and port of the RAN node extracted from a source IP address field and a source port field of the connection request message. The method further includes forwarding, by the connection load balancer, the connection request message to the mobility management node instance selected using the connection distribution algorithm.

According to yet another aspect of the subject matter described herein, publishing the IP address comprises broadcasting, by the connection load balancer, gratuitous ARP or Internet control management protocol version 6 (ICMPv6) neighbor discovery messages that associate the IP address with a medium access control (MAC) address of the connection load balancer.

According to yet another aspect of the subject matter described herein, the IP address published by the connection load balancer may be associated with a loopback interface of the mobility management node instances. Associating the IP address with a loopback address of the mobility management node instances enables the mobility management node instances to use the IP address as an alias without broadcasting address resolution protocol (ARP) or ICMP messages containing the IP address.

According to yet another aspect of the subject matter described herein, determining whether the message is an initial message or a subsequent message may include determining that the message is an initial message and determining whether the connection has been assigned to one of the mobility management node instances may include determining that the connection has not been assigned to one of the mobility management node instances. If the message is determined to be an initial message and the connection has not been assigned to one of the mobility management node instances, the S1 connection is assigned to one of the mobility management node instances using a load balancing algorithm. The initial message is then forwarded to the mobility management node instance assigned to the S1 connection.

According to yet another aspect of the subject matter described herein, determining whether the message is an initial message or a subsequent message associated with a S1 connection may include determining that the message is a subsequent message. Determining whether the S1 connection associated with the subsequent message has been assigned to one of the message processors may include determining that the S1 connection has been assigned to one of the mobility management node instances. If the message is determined to be a subsequent message for which the S1 connection has been assigned to one of the mobility management node instances, the message may be forwarded to the assigned mobility management node instance.

According to yet another aspect of the subject matter described herein, determining whether the message is an initial message or a subsequent message may include determining that the message is an initial message and determining whether the connection has been assigned to one of the mobility management node instances may include determining that the connection has not been assigned to one of the mobility management node instances. If the message is determined to be an initial message and the connection has not been assigned to one of the mobility management node instances, the N2 connection is assigned to one of the mobility management node instances using a load balancing algorithm. The initial message is then forwarded to the mobility management node instance assigned to the N2 connection.

According to yet another aspect of the subject matter described herein, determining whether the message is an initial message or a subsequent message associated with a N2 connection may include determining that the message is a subsequent message. Determining whether the N2 connection associated with the subsequent message has been assigned to one of the message processors may include determining that the N2 connection has been assigned to one of the mobility management node instances. If the message is determined to be a subsequent message for which the N2 connection has been assigned to one of the mobility management node instances, the message may be forwarded to the assigned mobility management node instance.

According to another aspect of the subject matter described herein, the method for distributing connections to mobility management node instances includes, at the mobility management node instances, listening on the IP address published by the connection load balancer.

According to another aspect of the subject matter described herein, a group refers to group of connections initiated from specific peer RAN node towards the mobility management node. Connections from each peer RAN node thus gets segregated into different groups at connection load balancer. Each group is identified by the IP address(es) of the peer RAN node at connection load balancer used as the source address(es) for the initial message.

According to yet another aspect of the subject matter described herein, for each S1 connection request landing on connection load balancer, its source IP address(es) are used to identify the group where load balancing algorithm is evaluated.

According to yet another aspect of the subject matter described herein, assigning one of the mobility management node instances to the S1 connection using a load balancing algorithm includes maintaining a group count for each of the mobility management node instances for each group, where the group count is indicative of a number of S1 connections assigned to each mobility management node instances. For each mobility management node instance, a group count difference between the group count for the mobility management node instance and a lowest group count of the mobility management node instances is calculated. Message processors having a group count difference that is less than a connection distribution threshold are included as connection distribution candidates. Mobility management node instances with a group count difference greater than or equal to the connection distribution threshold are excluded from consideration as connection distribution candidates.

According to yet another aspect of the subject matter described herein, for each N2 connection request landing on connection load balancer, its source IP address(es) are used to identify the group where load balancing algorithm is evaluated.

According to yet another aspect of the subject matter described herein, assigning one of the mobility management node instances to the N2 connection using a load balancing algorithm includes maintaining a group count for each of the mobility management node instances for each group, where the group count is indicative of a number of N2 connections assigned to each mobility management node instances. For each mobility management node instance, a group count difference between the group count for the mobility management node instance and a lowest group count of the mobility management node instances is calculated. Mobility management node instances having a group count difference that is less than a connection distribution threshold are included as connection distribution candidates. Message processors with a group count difference greater than or equal to the connection distribution threshold are excluded from consideration as connection distribution candidates.

According to another aspect of the subject matter described herein, the method for distributing connections to mobility management node instances includes detecting failure of one of the mobility management node instances and automatically routing the connection request message to an available mobility management node instance.

According to another aspect of the subject matter described herein, the method for distributing connections to mobility management node instances includes detecting reestablishment of the mobility management node instance and applying the connection distribution algorithm includes including the reestablished mobility management node instance as a selection candidate of the connection distribution algorithm.

According to another aspect of the subject matter described herein, the method for distributing connections to mobility management node instances includes detecting availability of a new mobility management node instance and applying the connection distribution algorithm includes including the new mobility management node instance as a selection candidate of the connection distribution algorithm.

According to another aspect of the subject matter described herein, a system for distributing connections to mobility management node instances is provided. The system includes a connection load balancer including at least one processor and a memory. The system further includes an S1/N2 connection distributor for publishing Internet protocol (IP) addresses for receiving connection requests and ingress messages from radio access network (RAN) nodes, maintaining connection loading measurements of the mobility management node instances, receiving a connection request message generated by a RAN node for initiating a connection with one of the mobility management node instances, applying a connection distribution algorithm to select a mobility management node instance to handle the connection request message, creating, by the connection load balancer, for protocol continuity, and in a database or cache populated at least in part by the connection load balancer, an association between an IP address of the selected mobility management node instance and an IP address and port of the RAN node extracted from a source IP address field and a source port field of the connection request message. and forwarding the connection request message to the mobility management node instance selected using the connection distribution algorithm.

According to another aspect of the subject matter described herein, the S1/N2 connection distributor is configured to publish the IP address by broadcasting a gratuitous address resolution protocol (ARP) or ICMPV6 neighbor discovery messages to a border gateway node associating the IP address with a media access control (MAC) address of an interface of the connection load balancer.

According to another aspect of the subject matter described herein, the S1/N2 connection distributor is configured to maintain 1 or more groups. Each group is configured with 1 or more IP addresses of Peer RAN which the group represents.

According to another aspect of the subject matter described herein, the S1/N2 connection distributor is configured with connection distribution threshold.

According to another aspect of the subject matter described herein, the S1/N2 connection distributor is configured to maintain the connection load information per configured group. For each configured group, the S1/N2 connection distributor maintain a group count for each of the mobility management node instances, where the group count comprises a count of number of connections with the mobility management node instance, and wherein the S1/N2 connection distributor is further configured to calculate for each mobility management node instance a group count difference between the group count for the mobility management node instance and a lowest group count of the mobility management node instance, and include, as connection distribution candidates, mobility management node instances having a group count difference that is less than connection distribution threshold.

According to yet another aspect of the subject matter described herein, the S1/N2 connection distributor is configured to detect failure of one of the mobility management node instances and automatically route the connection request message to an available mobility management node instance.

According to another aspect of the subject matter described herein, the S1/N2 connection distributor is configured to detect reestablishment of the mobility management node instance and include the reestablished mobility management node instance as a selection candidate of the connection distribution algorithm.

According to yet another aspect of the subject matter described herein, the S1/N2 connection distributor is configured to detect availability of a new mobility management node instance and include the new mobility management node instance as a selection candidate of the connection distribution algorithm.

According to yet another aspect of the subject matter described herein, a non-transitory computer readable medium having stored thereon executable instructions that when executed by a processor of a computer control the computer to perform steps is provided. The steps include publishing, by a connection load balancer, Internet protocol (IP) addresses for receiving connection requests and ingress messages from radio access network (RAN) nodes. The steps further include maintaining, by the connection load balancer, connection loading measurements of the mobility management node instances. The steps further include receiving, at the connection load balancer, a connection request message generated by a RAN node for initiating a connection with one of the mobility management node instances. The steps further include applying, by the connection load balancer, a connection distribution algorithm to select a mobility management node instance to handle the connection request message. The steps further include includes creating, by the connection load balancer, for protocol continuity, and in a database or cache populated at least in part by the connection load balancer, an association between an IP address of the selected mobility management node instance and an IP address and port of the RAN node extracted from a source IP address field and a source port field of the connection request message. The steps further include forwarding, by the connection load balancer, the connection request message to the mobility management node instance.

According to another aspect of the subject matter described herein, the connection request message comprises connection request message for S1 or an N2 connection.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 7 is a call flow diagram illustrating connection distribution using a connection load balancer;

DETAILED DESCRIPTION

Mobile networks are growing with multiple technologies and interconnects to carry the signaling. One current challenge with mobile communications networks is moving applications and nodes that provide services in mobile communications networks into the cloud. Cloud based environments also require smart scaling up and down of networks. There is potential need to reconfigure the MME/AMF nodes in case they are scaling up/down in the cloud. All of the S1/N2 connections need to be added/removed while scaling up and down. S1 connection are connections between radio access network (RAN) nodes and the MME. N2 connections are connections between RAN nodes and the AMF.

The subject matter described herein aims at resolving the problem of reconfiguration of the MME/AMF nodes using a connection load balancer (CLB), which may be located in the cloud. This will allow the networks to manage the scaling up and down of MMEs and/or AMFs without affecting the RAN nodes connected to the MME/AMF nodes in the cloud or on premise.

In current systems, multiple MME/AMF nodes operate as multiple instances to ease scaling/high availability processing of S1/N2 traffic from the RAN side, such that each MME/AMF instance has dedicated connections with external RAN nodes. Each MME/AMF instance may have multiple S1/N2 connections from same RAN node. One RAN node may have S1/N2 connections spanning across multiple MME/AMF instances for high availability.

When any one or more MME/AMF instances goes down (due to an error or scaling down), all of the S1/N2 connections with these instances are disconnected. When an MME/AMF instance comes up (after disaster recovery or scale up), new S1/N2 connections from the RAN have to be configured. Because of the above facts, the remote RAN node seeking to reconnect with the MME/AMF instance needs to manage each S1/N2 connection with different IP addresses to achieve load distribution across MME/AMF instances. Requiring the remote RAN to separately manage each S1/N2 connection with a different IP address causes a configuration burden on the remote RAN node, especially in the case where connections need to be reestablished after an MME or AMF becomes operational again after a period of being non-operational.

Figure 1:
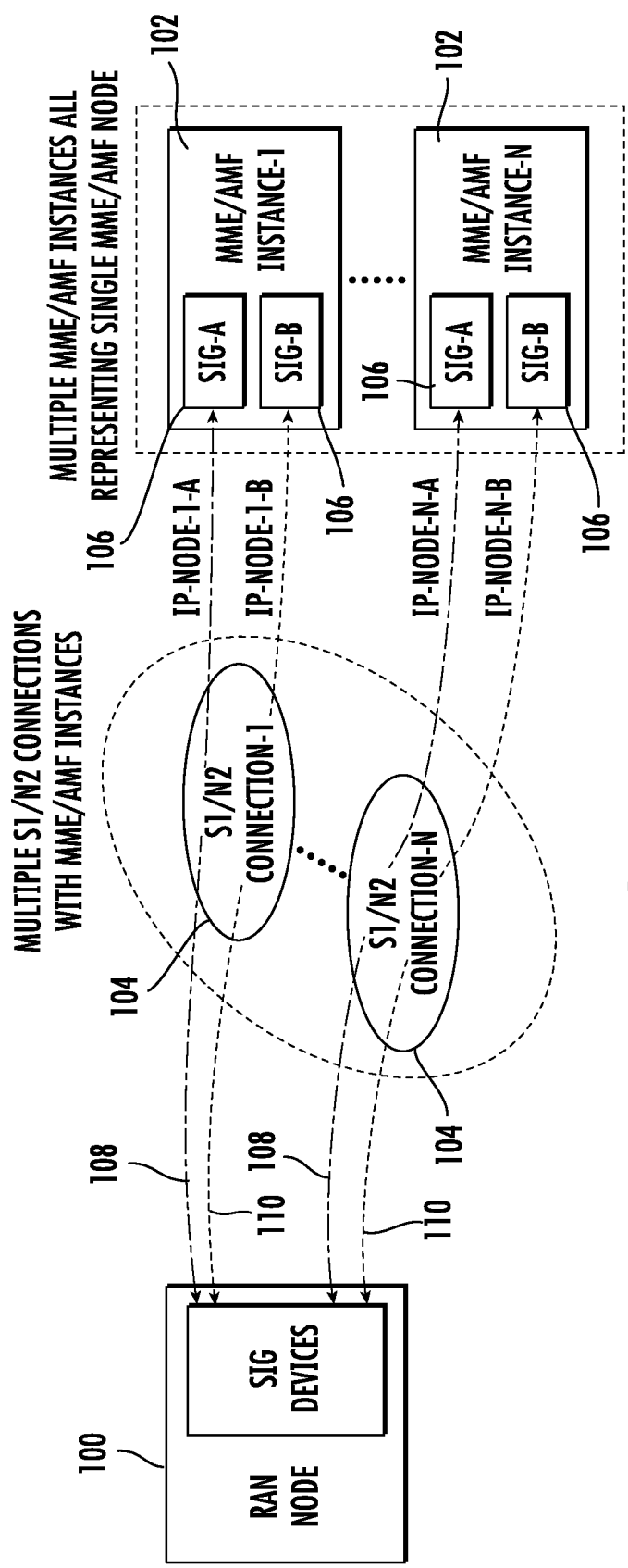
FIG. 1 is a network diagram illustrating S1 or N2 connections between a radio access node and MME or AMF instances.

FIG. 1 illustrates a RAN node connected to multiple MME/AMF instances where the MME/AMF instances represent a single MME/AMF node. Referring to FIG. 1, RAN node 100 is connected to multiple MME/AMF instances 102 via S1/N2 connections 104. Each MME/AMF instance 102 includes Ethernet interfaces 106 on networks A and B. Each Ethernet interface 106 includes a MAC address, and a separate IP address is associated with each Ethernet interface 106.

In the illustrated example, the S1/N2 connections 104 each include the primary ingress connection path 108 associated with one of the Ethernet interfaces of MME/AMF 102 and a secondary ingress connection path 110 associated with another Ethernet interface 106 of an MME/AMF instance 102. The primary and secondary communications path may be stream control transmission protocol (SCTP)-based multi-homed connection paths. However, the subject matter described herein is not limited to using SCTP multi-homed connections with only two associations. The number of associations can scale from 1 to a maximum number of associations supported by the SCTP protocol. However, the subject matter described herein is not limited to using SCTP as the transport layer protocol. Transmission control protocol (TCP) could be used instead of SCTP without departing from the scope of the subject matter described herein.

In the illustrated example, the IP address IP-Node-N-A is the IP address of MME/AMF instance-1 102 on signaling device or Ethernet interface A 106. The IP address IP-Node-N-B is the IP address of MME/AMF instance-1 102 on signaling device B or Ethernet interface B 106. The IP address IP-Node-N-A is the IP address of MME/AMF instance-N 102 on signaling device or Ethernet interface A 106. The IP address IP-Node-N-B is the IP address of MME/AMF instance-N 102 on signaling device or Ethernet interface B 106.

Remote RAN nodes can connect to MME/AMF instances over S1/N2 connections where the MME/AMF instances are implemented on a single processor or on multiple processors, depending on the redundancy model chosen. The subject matter described herein is not limited to managing S1/N2 connections to MME/AMF instances implemented on a single process or on multiple processors. Either case is intended to be within the scope of the subject matter described herein.

Figure 2:
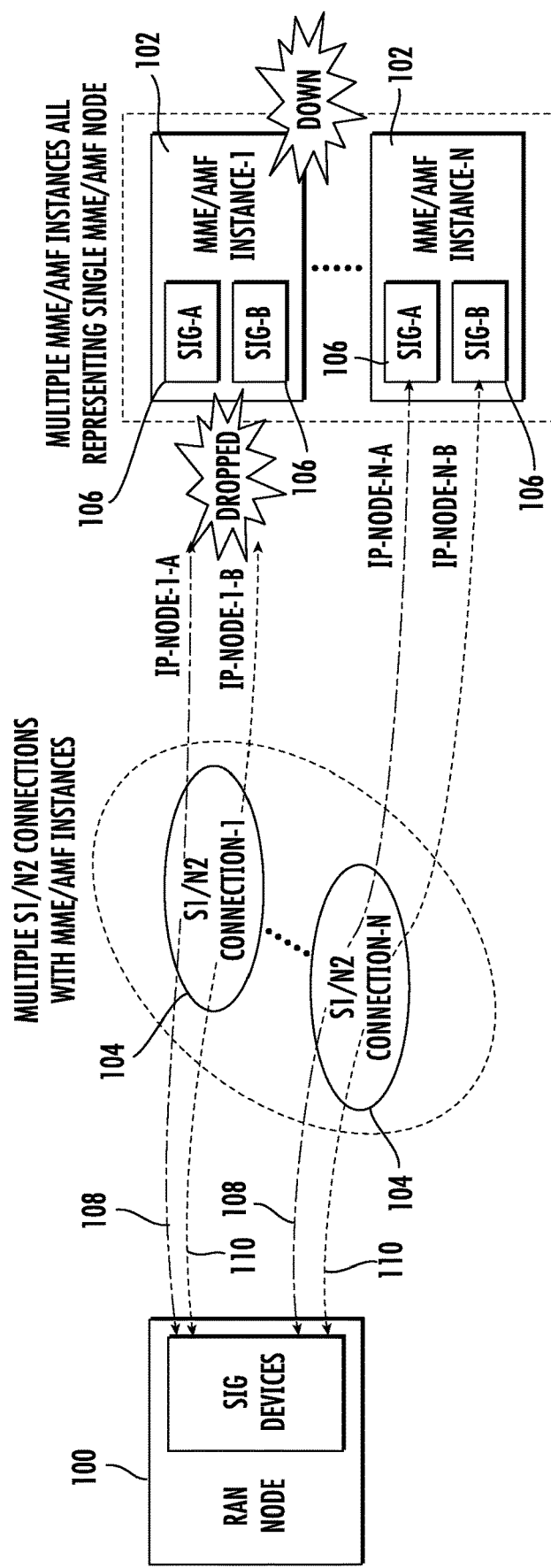
FIG. 2 is a network diagram illustrating problems that occur when an MME or AMF node instance goes down.

FIG. 2 illustrates some of the issues with the current network architecture when an MME/AMF instance goes down. When an MME/AMF instance goes down, the RAN node formerly connected to the affected MME/AMF may need to reconfigure the affected connections with fixed IPs of another MME/AMF instance. Such reconfiguration is burdensome for both ends of the S1/N2 connection.

In addition to the reconfiguration issues caused by the current architecture, automatic connection distribution to the least loaded MME/AMF instance may not be possible. RAN nodes may not have visibility into the loading of MME/AMF instances, especially when the instances change due to outages or changes in cloud configurations. As a result, distribution of S1/N2 connections by the RAN nodes may be sub-optimal.

Another issue that may be present with the current network architecture is that when any MME/AMF instance (or multiple instances) go down, connections connected to it/them are not automatically distributed to other MME/AMF instances, thus leaving fewer operational connections unless manual intervention is performed to re-configure connections with other MME/AMF instances. When an MME/AMF instance goes out of service, automatic reconfiguration of connections may not be possible.

In the example illustrated in FIG. 2, when one of MME/AMF instances 102 goes down, the S1/N2 connections connected to the failed or out of service MME/AMF instance 102 are dropped. Reconnection attempts with the failed MME/AMF 102 will result in connection failure. In addition, there is no automatic load distribution to the remaining MME/AMF 102.

To avoid or mitigate at least some of the difficulties associated with the current S1/N2 connection architecture, a connection load balancer may be provided between the RAN node(s) and the MME/AMF instances to perform automatic reconfiguration of connections when the MME/AMF instance configuration changes without requiring reconfiguration of connections between the connection load balancer and the remote RAN nodes. For example, the connection load balancer could be used to resolve the issues mentioned with respect to FIG. 2.

In one implementation, the connection load balancer exposes a single set of public IP addresses to connect to all the MME/AMF instances being used to provide service to the RAN nodes. This provides the flexibility to the MME/AMF node to scale up or down without requiring a change in the public IP address information provided to the RAN nodes. Because the public IP addresses exposed by the connection load balancer are independent from the MME/AMF configuration, the MME/AMF configuration can change without requiring the remote RAN nodes to reconfigure S1/N2 connections.

In addition to reducing the amount of reconfiguration required on the part of remote RAN nodes, the connection load balancer provides the flexibility to automatically balance the connections on the available MME/AMF resources, hence optimizing resource usage. For example, the connection load balancer may maintain measurements of S1/N2 connection loading of the MME/AMF instances and use these measurements to make S1/N2 connection distribution decisions. In the case of a message processing capacity loss in the MME/AMF node, the connection load balancer can redistribute the connections to other MME/AMF instances and provide the same level of service to the remote RAN nodes.

Figure 3:
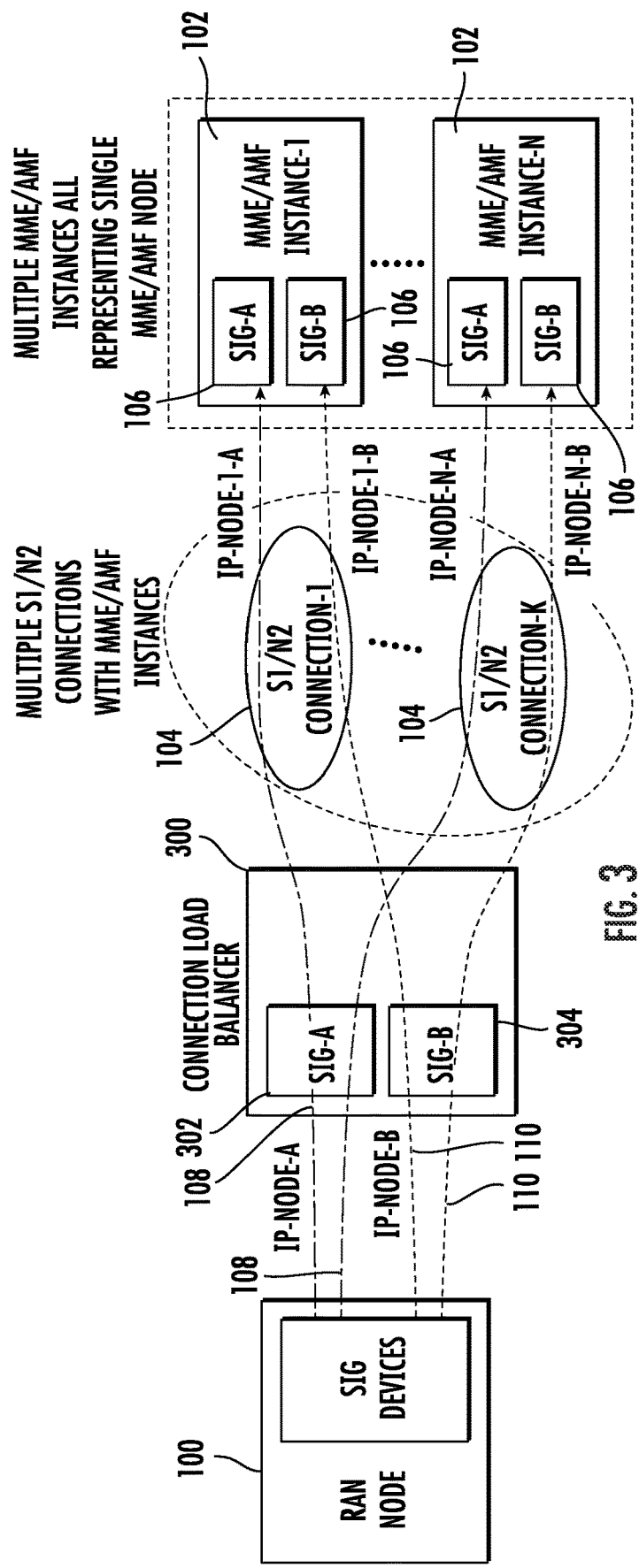
FIG. 3 is a network diagram illustrating the mobile communications network with a connection load balancer for load balancing S1/N2 connections with MME/AMF instances that avoids at least some of the difficulties associated with current systems.

In FIG. 3, connection load balancer 300 includes Ethernet interfaces 302 and 304. Connection load balancer 300 only exposes the IP addresses IP-Node-A and the IP address IP-Node-B to RAN devices, such as RAN node 100. The IP addresses IP-Node-1-A, IP-Node-1-B, IP-Node-N-A, and IP-Node-N-B are not published to the RAN nodes. As virtual entities, connection load balancer 300 and/or mobility management node instances 102 may represent a virtual machine that runs on a hypervisor on cloud computing hardware.

Figure 4:
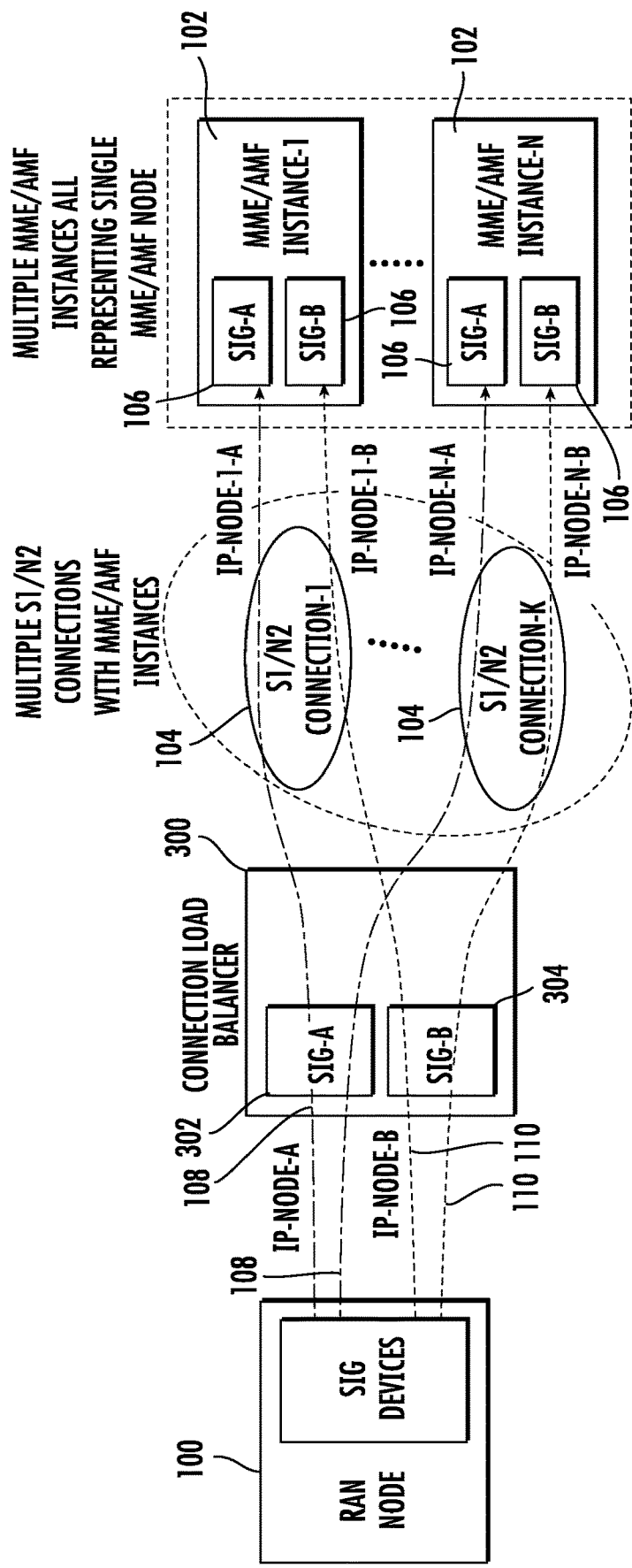
FIG. 4 is a network diagram illustrating the load balancing of ingress traffic over S1 or N2 connections using a connection load balancer.

FIG. 4 illustrates one example of a proposed solution using the connection load balancer for ingress traffic. In FIG. 4, connection load balancer 300 receives S1/N2 connection requests from RAN node 100, performs load balancing to load balance the requests among MME/AMF instances 102, and forwards the connection requests to the selected MME/AMF 102. Because the IP addresses of MME/AMF 102 were not exposed to RAN node 100, if MME/AMF instances 102 need to be scaled up or down, such scaling can be handled seamlessly at connection load balancer 300, as will be described in more detail below. The IP address IP-Node-A is published to RAN node 100 and other RAN nodes on network A. RAN node 100 and the other RAN nodes on network A use the IP address IP-Node-A as the destination IP address for ingress S1/N2 connections on network A, where the ingress direction is from the RAN nodes to the MME/AMF instances. The IP address IP-Node-B is published to RAN node 100 and other RAN nodes on network B. RAN node 100 and the other nodes on network B use the IP address IP-Node-B as the destination IP address for ingress S1/N2 connections on network B.

Figure 5:
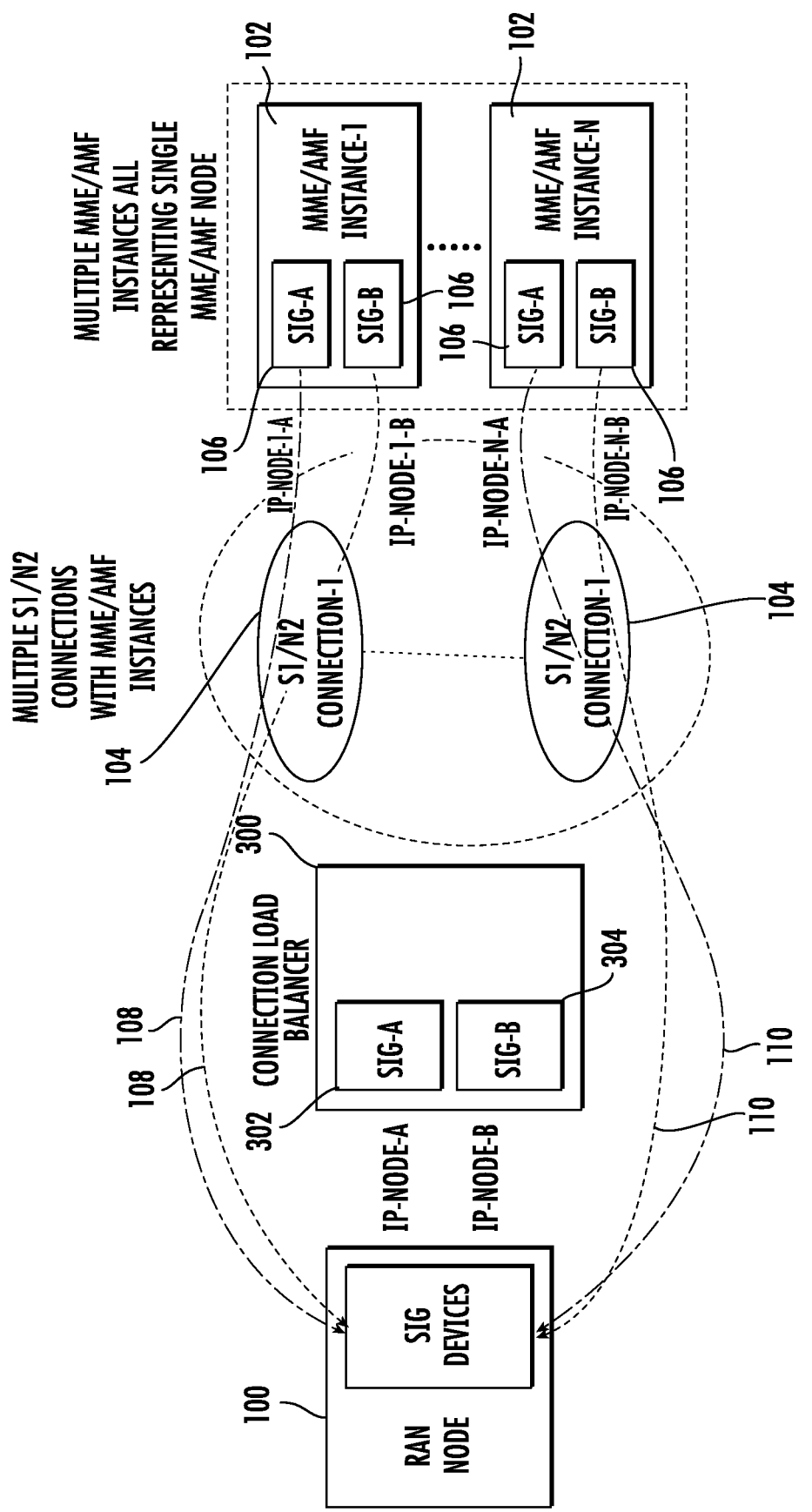
FIG. 5 is a network diagram illustrating the flow of egress traffic in a mobile communications network that includes a connection load balancer.

FIG. 5 illustrates the path of egress traffic using a network that includes connection load balancer 300. In FIG. 5, it can be seen that egress traffic travels from MME/AMF instances 102 to RAN node 100 without passing through connection load balancer 300. The egress direction, in this example, refers to the direction from the MME/AMF instances to the RAN nodes. Egress traffic from the MME/AMF instances will not pass through connection load balancer 300 because the egress traffic is addressed to the IP addresses of the remote RAN nodes obtained from ingress messages from the remote RAN nodes.

Figure 6A:
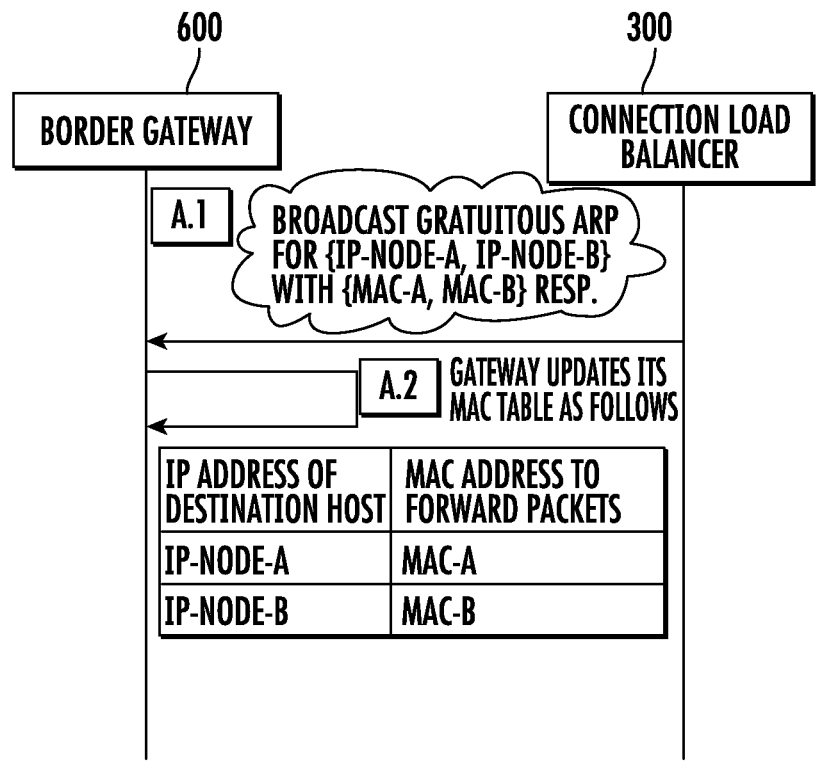
FIGS. 6A and 6B are call flow diagrams illustrating connection load balancer initialization.
Figure 6B:
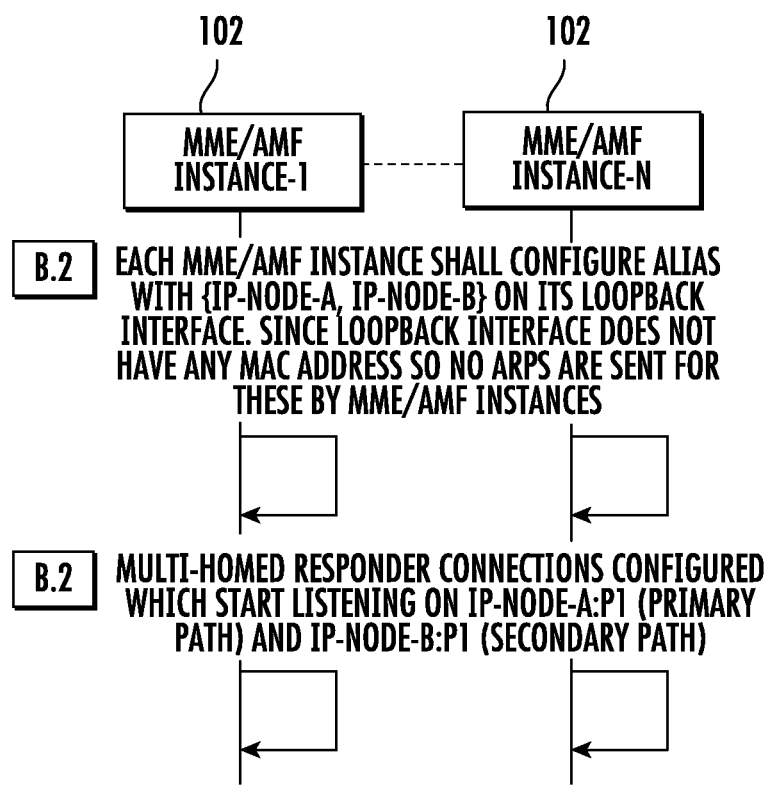

FIGS. 6A and 6B illustrate an initialization stage of connection load balancer 300. In FIG. 6A step A.1, a border gateway 600, which may be connected between RAN node 100 and connection load balancer 300, receives broadcast gratuitous address resolution protocol (ARP) messages or ICMPv6 neighbor discovery messages from connection load balancer 300. The broadcast gratuitous ARP messages or ICMPv6 neighbor discovery messages associate the IP addresses IP-Node-A and IP-Node-B with media access control (MAC) addresses MAC-A and MAC-B, respectively. In step A.2, border gateway 600 updates its MAC table to associate the IP addresses IP-Node-A and IP-Node-B with MAC addresses MAC-A and MAC-B respectively. It should be noted that the MAC addresses MAC-A and MAC-B are associated with Ethernet interfaces 302 and 304 of connection load balancer 300, rather than of the MME/AMF instances.

FIG. 6B illustrates steps for configuring the MME/AMF instances. Referring to FIG. 6B, in step B.1, each MME/AMF instance configures alias IP addresses IP-Node-A and IP-Node-B on its loopback interface. Since the loopback interface does not have a MAC address, no ARP messages and ICMPv6 neighbor discovery messages are sent by these MME/AMF interfaces. In step B.2, each MME/AMF instance is configured with a multi-homed responder connection that begins listening for incoming S1/N2 connection requests on the address IP-Node-A for the primary path and the address IP-Node-B for the secondary path. As indicated above, the IP addresses IP-Node-A and IP-Node-B are associated with the MAC addresses MAC-A and MAC-B of connection load balancer 300. Because remote RAN nodes use the IP addresses IP-Node-A and IP-Node-B to connect with plural different MME/AMF instances, and the connection load balancer decides which MME/AMF instance should handle a given connection request, MME/AMF instances can be reconfigured without requiring remote RAN nodes to reconfigure their S1/N2 connections as a result of the reconfiguration.

As stated above, one function that may be performed by connection load balancer 300 is distribution of S1/N2 connections from remote RAN nodes among MME/AMF instances. FIG. 7 is a message flow diagram illustrating an example of messages that may be exchanged in a connection distribution algorithm implemented by connection load balancer 300. Referring to FIG. 7, in step C.1, an S1/N2 connection request for Connection-1 with destination IP addresses {IP-Node-A, IP-Node-B} and source IP addresses {R-IP-x, R-IP-y} and destination port P1 arrives from a remote RAN Node node.

In step C.2, border gateway 600 queries its MAC table for {IP-Node-A, IP-Node-B} and forwards the connection request for Connection-1 to connection load balancer 300. In step C.3, connection load balancer 300 applies a connection distribution algorithm to determine the MME/AMF instance to which the connection request should be forwarded. In one exemplary implementation, connection load balancing is performed based on following parameters:

Group: Represents all connections from a specific peer, i.e. a RAN node

Group count (i.e. a count of connections from the remote RAN node per MME/AMF instance per group)—Initialized to zero for all MME/AMF instances.

Connection distribution threshold (valid across group)—MME/AMF instances with a group count difference that is equal to or greater than this value from the lowest group count will not be considered as candidates to receive a new connection request. For example, if MME/AMF instances 1, 2, and 3 have group counts of 1, 2, and 3, and the connection distribution threshold is 2, MME/AMF instances 1 and 2 will be considered as candidates for receiving a new connection request. MME/AMF instance 1 is the instance with the lowest group count and thus has a group count difference of 1−1=0, which is less than the connection distribution threshold of 2. MME/AMF instance 2 has a group count difference with respect to MME/AMF instance 1 of 2−1=1, which is less than the connection distribution threshold of 2. MME/AMF instance 3 has a group count difference of 3−1=2 with respect to MME/AMF instance 1. Since 2 is equal to the connection distribution threshold, MME/AMF instance 3 will not be considered as a candidate to receive a new connection request.

In the case where multiple MME/AMF instances have group count differences less than the connection distribution threshold, connection load balancer 300 may select among the available candidates using any suitable parameter, such as instance identifier of MME/AMF instance in ascending order. Continuing with the previous example, if MME/AMF instances 1 and 2 are candidates for a new connection request, MME/AMF instance 1 may be selected for the new connection request before MME/AMF instance 2 based on the ascending order of instance identifier principle.

Once connection load balancer 300 identifies the MME/AMF instance to which the connection request should be forwarded, connection load balancer 300 may perform the following steps:

Increment the group count of MME/AMF instance i (MME/AMF instance i is the MME/AMF instance to which connection load balancer 300 determined that the connection load balancer should be forwarded)

Create an association record in its cache for protocol continuity:

In this example, the association record associates the source IP address and source port of the remote peer with the destination IP address of the MME/AMF instance. Symbolically, the association record may be as follows {Src-IP, Src-Port, Dest-IP (MME/AMF instance)}. In FIG. 5, the destination IP address of the MME/AMF of interest is IP-Node-A-1, which is the IP address of the MME/AMF instance that is different from the alias IP address IP-Node-A published by connection load balancer 300.

In step C.4, connection load balancer 300 forwards the connection request to MME/AMF instance-i as decided in step C.3.

In step C.5, MME/AMF instance-i accepts the connection. Responses are sent directly to the remote peer via a border gateway. The connection load balancer is not in the return path for messages sent from MME/AMF instance i to RAN node 100.

Figure 8:
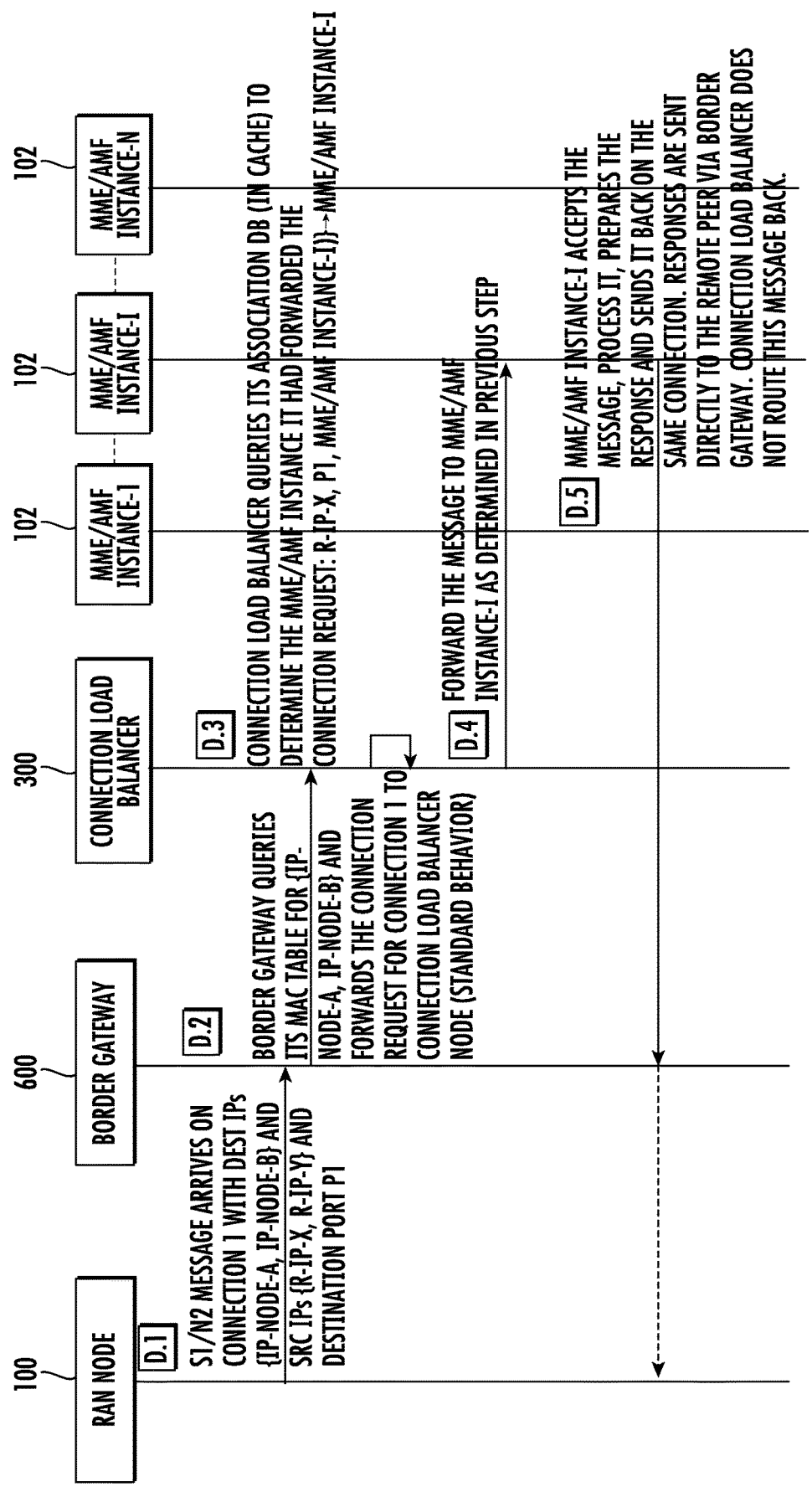
FIG. 8 is a call flow diagram illustrating protocol continuity using a connection load balancer.

FIG. 8 is a message flow diagram illustrating signaling for call continuity in a network that includes connection load balancer 300. Referring to FIG. 8, in step a1, an S1/N2 message with destination IP addresses {IP-Node-A, IP-Node-A}, source IP addresses {R-IP-x, R-IP-y} and destination port P1 arrives on connection-1.

In step D.2, border gateway 600 queries its MAC table for {IP-Node-A, IP-Node-B} and forwards the S1/N2 message on connection-1 to connection load balancer 300. In this example, it is assumed that the connection request for Connection-1 has already been processed as described above.

In step D.3, connection load balancer 300 queries its association database (in cache memory) to determine the MME/AMF instance to which connection load balancer 300 previously forwarded the connection request message. In this example, it is assumed that the following association record exists in the association database maintained by connection load balancer 300:

{R-IP-x, P1, MME/AMF Instance-i)} →MME/AMF Instance-i.

This entry was created in by connection load balancer 300 in its association database based on the application of the load balancing algorithm to the connection request, as described above.

In step D.4, connection load balancer 300 forwards the message to MME/AMF instance i as determined in step D.3.

In step D.5, MME/AMF instance i accepts the message, process the message, prepares the response, and sends the response over the same connection. Responses are sent directly to the remote peer via border gateway 600. Connection load balancer 300 is not in the forwarding path for messages sent from MME/AMF instances 102 to RAN nodes 100.

Figure 9:
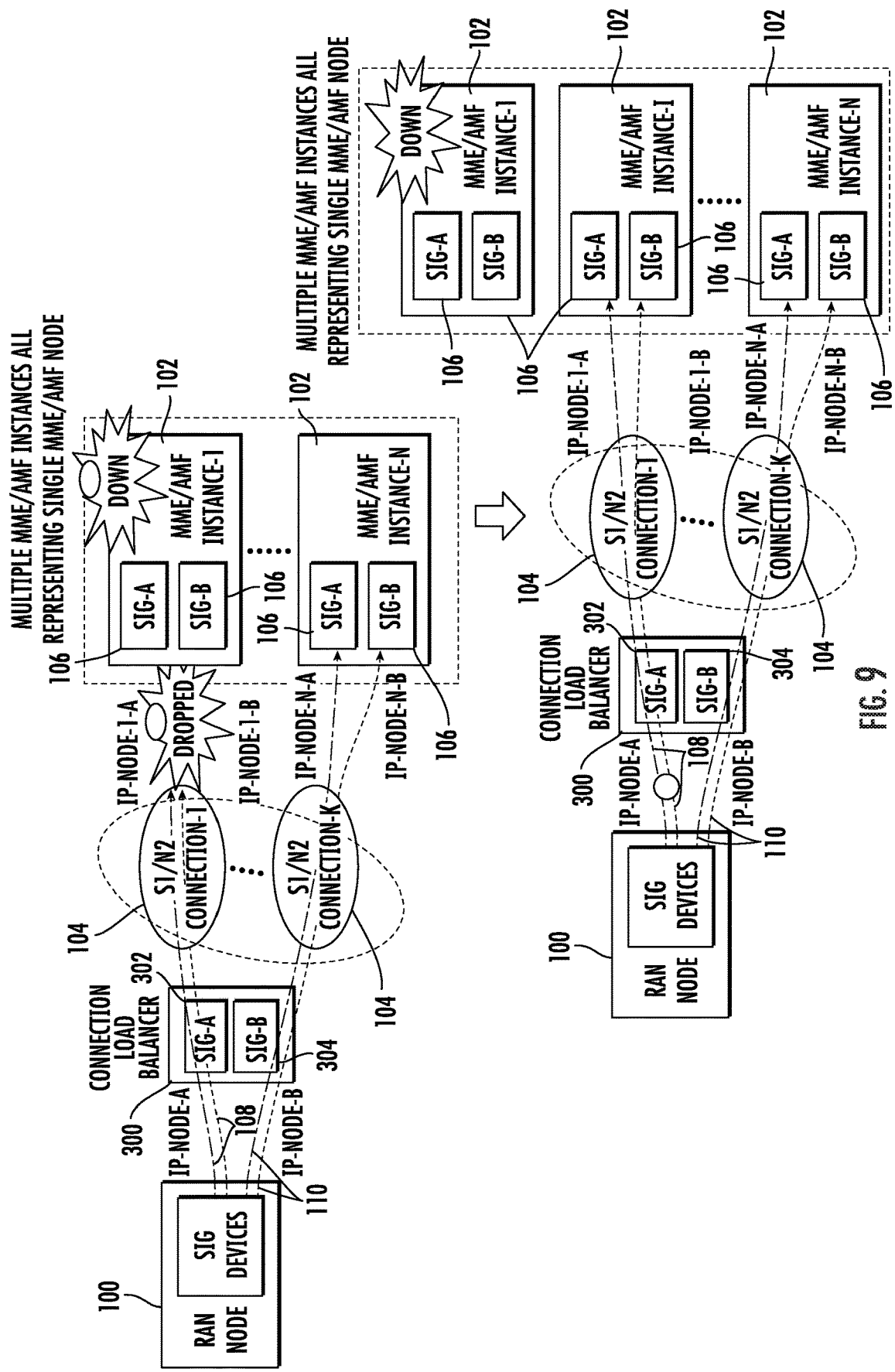
FIG. 9 is a network diagram illustrating RAN connection establishment using a connection load balancer.

FIG. 9 is a diagram illustrating RAN connection reestablishment. In FIG. 9, in step 1, MME/AMF instance 1 102 serving S1/N2 connection 1 goes down. In step 2, S1/N2 connection 1 connected with MME/AMF instance 1 102 drops. In step 3, S1/N2 connection 1 reestablishment is attempted by remote RAN node 100. Connection load balancer 300 reroutes the connection request to MME/AMF instance-i based on the connection distribution algorithm described above. It is not necessary for remote RAN node 100 to know the IP address of the new MME/AMF instance to which the connection is being re-rerouted. Remote RAN node 100 sends the reconnection request to the alias IP address published by connection load balancer 300 on behalf of the MME/AMF instance, and connection load balancer 300 uses its connection distribution algorithm to select an MME/AMF instance for handling the connection re-establishment request.

Figure 10:
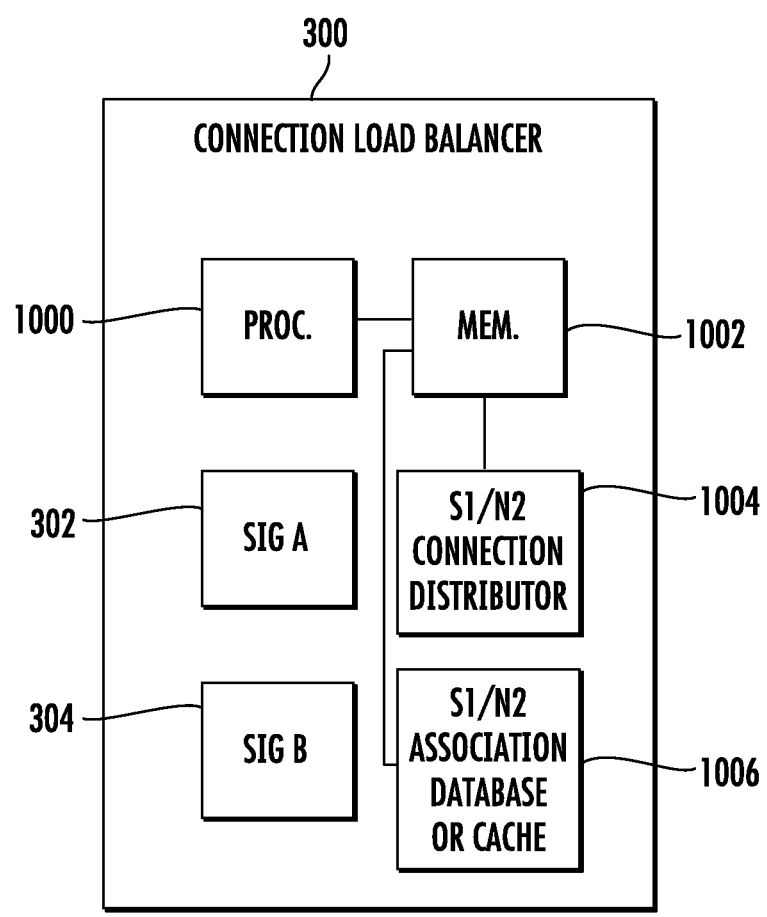
FIG. 10 is a block diagram illustrating an exemplary connection load balancer.

FIG. 10 is a block diagram illustrating an exemplary connection load balancer. Referring to FIG. 10, connection load balancer 300 includes at least one processor 1000 and a memory 1002. The S1/N2 connection distributor 1004 may be implemented in software stored in memory 1002 to perform the S1/N2 connection distribution steps described herein. Connection load balancer 300 also includes signaling or Ethernet interfaces 302 and 304 that receive the incoming S1/N2 connection requests from RAN nodes. In one example, connection load balancer 300 associates MAC addresses of signaling interfaces 302 and 304 with published IP addresses that are also associated with loopback interfaces of MME/AMF instances 102. Connection load balancer 300 may also include an S1/N2 association cache or database 1006 that is populated at least in part by connection load balancer 300 with associations between IP addresses of MME/AMF instances 102 selected to handle connections and remote RAN peer IP addresses and ports. For example, S1/N2 connection distributor 1004 may create, in S1/N2 association database or cache 1006, associations between IP addresses of MME/AMF instances 102 assigned to connections and IP addresses and ports of remote RAN nodes extracted from source IP address and port fields of connection management messages.

Figure 11:
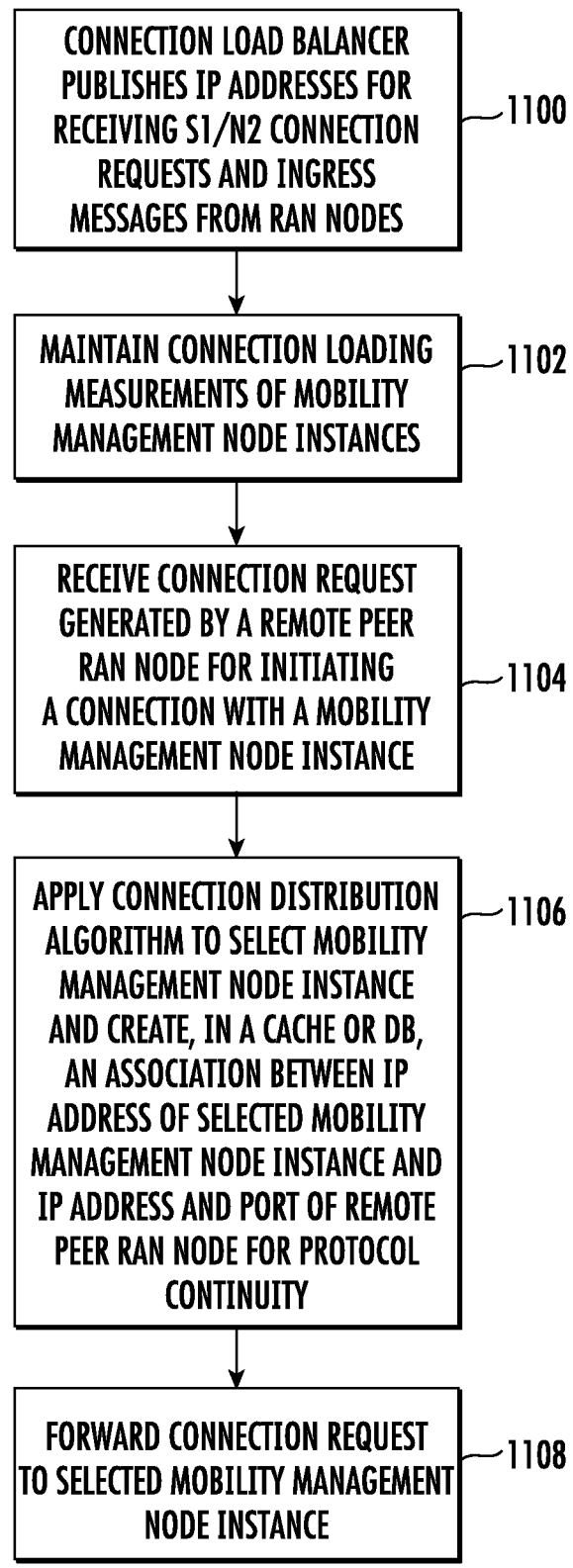
FIG. 11 is a flow chart illustrating an exemplary process performed by a connection load balancer for S1/N2 connection distribution.

FIG. 11 is a flow chart illustrating an exemplary method that may be implemented by connection load balancer 300 in distributing S1/N2 connections to mobility management nodes. Referring to FIG. 11, in step 1100, the method includes publishing, by the connection load balancer, Internet protocol (IP) addresses for receiving S1/N2 connection requests and ingress messages from RAN nodes. For example, S1/N2 connection distributor 1004 of connection load balancer 300 may broadcast gratuitous ARP messages or ICMPv6 neighbor discovery messages that associate published IP addresses with MAC addresses of the signaling interfaces of the connection load balancer at the border gateway. Using the IP address IP-Node-A in FIGS. 5 and 6A as an example, connection load balancer 300 sends a gratuitous ARP messages or ICMPv6 neighbor discovery messages to border gateway 600 that associates the IP address IP-Node-A with the MAC address MAC-A, which is the MAC address of the signaling interface SIG-A 302 of connection load balancer 300. Each MME/AMF instance 102 configures its loopback interface with the IP address IP-Node-A as an alias address. The reason that the loopback interface is used for adding the published IP addresses as alias on MME/AMF instances is that the loopback interface doesn't have a MAC address, and an ARP reply or ICMPv6 neighbor discovery message response is not sent if ARP requests or ICMPv6 neighbor discovery requests are received for IP addresses configured as aliases on the loopback interface. Thus, multiple MME/AMF instances can configure the same published IP addresses with no network conflicts. The reason that the IP addresses IP-Node-A and IP-Node-B are configured as aliases on the loopback interfaces of MME/AMF instances is to bind a transport layer with these addresses so that the MME/AMF instances will listen on this port for S1/N2 connection requests.

Returning to FIG. 11, in step 1102, the method further includes maintaining, by the connection load balancer, connection loading measurements of the mobility management node instances for each group. In one example, connection load balancer 300 may maintain a group count for each MME/AMF instance 102 for all configured groups. The group count indicates the number of connections assigned to each MME/AMF instance 102 per group. Other loading measurements may be used without departing from the scope of the subject matter described herein.

In step 1104, the method further includes receiving, at the connection load balancer, a connection request message generated by a remote peer RAN node for initiating a connection with one of the mobility management node instances. For example, if the mobility management node instance is an MME, the connection request may be an S1 connection request. If the mobility management node instance is an AMF, the connection request may be an N2 connection request.

In step 1106, the method further includes applying, by the connection load balancer, a connection distribution algorithm to select a mobility management node instance to handle the connection request message and creating, by the connection load balancer, for protocol continuity, and in a database populated at least in part by the connection load balancer an association between the IP address of the selected mobility management node instance and an IP address and port of the remote RAN peer extracted from a source IP address and source port of the connection request message. For example, the connection distribution algorithm may select the MME/AMF instance from MME/AMF instances with group count differences that exceed the connection distribution threshold to receive a new S1 or N2 connection request. Connection load balancer 300 may create in S1/N2 association cache or database 306 an association between the published IP address associated with the selected MME or AMF instance and an IP address and port of the remote RAN peer. Using FIG. 5 as an example, the association could between an IP address and port of RAN node 100 and the IP address IP-Node-A published on behalf of one of MME/AMF instances 102 selected to handle the connection.

In step 1108, the method further includes forwarding, by the connection load balancer, the connection request message to the mobility management node instance selected using the connection distribution algorithm. For example, connection load balancer 300 may forward the connection request to the MME/AMF instance selected in step 1106 and update the group count for the MME/AMF instance. Connection load balancer create an association record in its cache for protocol continuity for the subsequent messages on this S1/N2 connection can be forwarded to this MME/AMF instance. In the message transmitted to the MME/AMF instance, the connection load balancer may include its MAC address as the source MAC address.

Advantages

The connection load balancer described herein provides at least the following advantages:

The connection load balancer described herein can be used to distribute S1/N2 connections among MME/AMF instances, which reduces the impact of changes in MME/AMF configuration on sending nodes. That is, the sending nodes or remote peers are not required to re-establish connections with new IP addresses when MME/AMF instances go down or if new MME/AMF instances are established.

The connection load balancer can be used to solve this problem by using single interface to a remote peer and managing the internal interfaces irrespective of whether one IP interface card or multiple interface cards are used for setting up S1/N2 connections.

Locating the connection load balancer upstream from MME/AMF nodes in cloud/on-premise environments has the following benefits:

Low reconfiguration impact on remote nodes when MME/AMF nodes are scaling up or down;

Automatic load balancing for S1/N2 traffic to optimally use the resources in the cloud; and High redundancy is achieved without requiring extensive external configuration on the part of remote peers.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributing connections to mobility management node instances, the method comprising:
   publishing, by a connection load balancer, Internet protocol (IP) addresses for receiving connection requests and ingress messages from radio access network (RAN) nodes;
   maintaining, by the connection load balancer, connection loading measurements of the mobility management node instances, wherein maintaining the connection loading measurements includes maintaining a group count for each of the mobility management node instances for all configured groups on each mobility management node instance, wherein a group comprises one or more IP addresses of RAN nodes which the group represents, and the group count comprises a count of a number of connections with the mobility management node instance and selecting a mobility management node instance includes selecting a mobility management node instance using the group count;
   applying, by the connection load balancer, a connection distribution algorithm to select a mobility management node instance to handle the connection request message;
   creating, by the connection load balancer, for protocol continuity, and in a cache or database populated at least in part by the connection load balancer, an IP address of the selected mobility management node instance and an IP address and port of the RAN node extracted from a source IP address and source port field of the connection request message; and
   forwarding, by the connection load balancer, the connection request message to the mobility management node instance selected using the connection distribution algorithm.

2. The method of claim 1 comprising:
   receiving, at the connection load balancer, a subsequent message on the connection;
   querying the cache or database using a source IP address and a source port extracted from the subsequent message to determine the IP address of the mobility management node instance serving the connection; and forwarding, by the connection load balancer, the subsequent message to the IP address of the mobility management node instance.

3. The method of claim 1 wherein publishing the IP addresses comprises broadcasting gratuitous address resolution protocol (ARP) messages or Internet control management protocol version 6 (ICMPv6) neighbor discovery messages to a border gateway node, each associating one of the published IP addresses with a media access control (MAC) address of an interface of the connection load balancer.

4. The method of claim 1 comprising configuring the IP addresses published by the connection load balancer as alias addresses of loopback interfaces of the mobility management node instances.

5. The method of claim 3 comprising, at the mobility management node instances, listening on the IP addresses published by the connection load balancer.

6. The method of claim 1 wherein the mobility management node instances comprise mobility management entity (MME) or access and mobility management function (AMF) instances and wherein receiving the connection request message comprises receiving an S1 or N2 connection request message.

7. The method of claim 1 comprising detecting failure of one of the mobility management node instances and automatically routing the connection request message to an available mobility management node instance.

8. The method of claim 7 comprising, detecting reestablishment of the mobility management node instance and wherein applying the connection distribution algorithm includes including the reestablished mobility management node instance as a selection candidate of the connection distribution algorithm.

9. The method of claim 1 comprising detecting availability of a new mobility management node instance and wherein applying the connection distribution algorithm includes including the new mobility management node instance as a selection candidate of the connection distribution algorithm.

10. A system for distributing connections to mobility management node instances, the system comprising:
a connection load balancer including at least one processor and a memory; and
an S1/N2 connection distributor implemented by the at least one processor for:
publishing Internet protocol (IP) addresses for receiving connection requests and ingress messages from radio access network (RAN) nodes;
maintaining connection loading measurements of the mobility management node instances, wherein maintaining the connection loading measurements includes maintaining a group count for each of the mobility management node instances for all configured groups on each mobility management node instance, wherein a group comprises one or more IP addresses of RAN nodes which the group represents, and the group count comprises a count of a number of connections with the mobility management node instance and selecting a mobility management node instance includes selecting a mobility management node instance using the group count;
receiving a connection request message generated by a RAN node for initiating a connection with one of the mobility management node instances;
applying a connection distribution algorithm to select a mobility management node instance to handle the connection request message;
creating, for protocol continuity and in a cache or database populated at least in part by the connection load balancer, an association between an IP address of the selected mobility management node instance and an IP address and port of the RAN node extracted from a source IP address and source port field of the connection request message; and
forwarding the connection request message to the selected mobility management node instance.

11. The system of claim 10 wherein the S1/N2 connection distributor is further configured for:
receiving, at the connection load balancer, a subsequent message on the connection;
querying, the cache or database with a source IP address and source port extracted from the subsequent message to determine the IP address of the mobility management node instance serving the connection; and
forwarding, by the connection load balancer, the subsequent message to the IP address of the mobility management node instance.

12. The system of claim 10 wherein publishing the IP addresses comprises broadcasting a gratuitous address resolution protocol (ARP) message or Internet control management protocol version 6 (ICMPv6) neighbor discovery messages to a border gateway node, each associating one of the published IP address with a media access control (MAC) address of an interface of the connection load balancer.

13. The system of claim 10 wherein the mobility management node instances comprise mobility management entity (MME) instances or access and mobility management function (AMF) instances and wherein receiving the connection request message comprises receiving an S1 or N2 connection request message.

14. The system of claim 10 wherein the S1/N2 connection distributor is configured to detect failure of one of the mobility management node instances and automatically route the connection request message to an available mobility management node instance.

15. The system of claim 14 wherein the S1/N2 connection distributor is configured to detect reestablishment of the mobility management node instance and wherein applying the connection distribution algorithm comprises including the reestablished mobility management node instance as a selection candidate of the connection distribution algorithm.

16. The system of claim 10 wherein the S1/N2 connection distributor is configured to detect availability of a new mobility management node instance and wherein applying the connection distribution algorithm comprises including the new mobility management node instance as a selection candidate of the connection distribution algorithm.

17. A non-transitory computer readable medium having stored thereon executable instructions that when executed by a processor of a computer control the computer to perform steps comprising:
publishing, by a connection load balancer, Internet protocol (IP) addresses for receiving connection requests and ingress messages from radio access network (RAN) nodes directed to mobility management node instances;
maintaining, by the connection load balancer, connection loading measurements of the mobility management node instances, wherein maintaining the connection loading measurements includes maintaining a group count for each of the mobility management node instances for all configured groups on each mobility management node instance, wherein a group comprises one or more IP addresses of RAN nodes which the group represents, and the group count comprises a count of a number of connections with the mobility management node instance and selecting a mobility management node instance includes selecting a mobility management node instance using the group count;

receiving, at the connection load balancer, a connection request message generated by a RAN node for initiating a connection with one of the mobility management node instances;

applying, by the connection load balancer, a connection distribution algorithm to select a mobility management node instance to handle the connection request message;

creating, by the connection load balancer, for protocol continuity, and in a cache or database populated at least in part by the connection load balancer, an association between an IP address of the selected mobility management node instance and an IP address and port of the RAN node extracted from a source IP address and source port field of the connection request message; and forwarding the connection request message to the mobility management node instance selected using the connection distribution algorithm.

18. The non-transitory computer readable medium of claim 17 comprising:

receiving, at the connection load balancer, a subsequent message on the connection;

querying, the cache or database with a source IP address and source port extracted from the subsequent message to determine the IP address of the mobility management node instance serving the connection; and forwarding, by the connection load balancer, the subsequent message to the IP address of the mobility management node instance.

* * * * *

UNITED STATES PATENT AND TRADEMARK OFFICE
CERTIFICATE OF CORRECTION

PATENT NO. : 11,576,072 B2
APPLICATION NO. : 17/027633
DATED : February 7, 2023
INVENTOR(S) : Yesh Goel It is certified that error appears in the above-identified patent and that said Letters Patent is hereby corrected as shown below:

On the Title Page

On page 2, Column 2, item (56) under U.S. Patent Documents, Line 22, delete "All" and insert -- Ali --, therefor.

On page 3, Column 1, item (56) under Other Publications, Line 22, delete "RFeport" and insert -- Report --, therefor.

On page 3, Column 2, item (56) under Other Publications, Line 59, delete "2," and insert -- 3, --, therefor.

On page 4, Column 1, item (56) under Other Publications, Line 27, delete "9," and insert -- 4, --, therefor.

On page 4, Column 1, item (56) under Other Publications, Line 67, delete ".Release" and insert -- Release --, therefor.

On page 4, Column 2, item (56) under Other Publications, Line 4, delete "3GPp," and insert -- 3GPP, --, therefor.

On page 4, Column 2, item (56) under Other Publications, Line 11, delete "fo" and insert -- of --, therefor.

On page 4, Column 2, item (56) under Other Publications, Line 30, delete "Spectific" and insert -- Specific --, therefor.

On page 4, Column 2, item (56) under Other Publications, Line 71, delete "Thesis," and insert -- Theses, --, therefor.

Signed and Sealed this
Nineteenth Day of December, 2023

Katherine Kelly Vidal
*Director of the United States Patent and Trademark Office*

In the Drawings

On sheet 8 of 11, in FIG. 8, under D.3, Line 3, delete "R-IP-X" and insert -- {R-IP-X --, therefor.

On sheet 8 of 11, in FIG. 8, under D.3, Line 3, delete ")}" and insert -- } --, therefor.

In the Specification

In Column 4, Line 43, delete "message." and insert -- message --, therefor.

In Column 6, Line 62, delete "reconfiguration" and insert -- re-configuration --, therefor.

In Column 10, Line 22, delete "Node node." and insert -- node. --, therefor.

In Column 10, Line 32, delete "i.e." and insert -- i.e., --, therefor.

In Column 10, Line 33, delete "(i.e." and insert -- (i.e., --, therefor.

In Column 11, Line 31, delete "a1," and insert -- D.1, --, therefor.

In Column 11, Lines 32-33, delete "{IP-Node-A, IP-Node-A}," and insert -- {IP-Node-A, IP-Node-B}, --, therefor.

In Column 11, Line 48, delete ")}" and insert -- } --, therefor.